(12) United States Patent
Liu et al.

(10) Patent No.: US 11,731,611 B2
(45) Date of Patent: Aug. 22, 2023

(54) VEHICLE STABILITY CONTROL METHOD AND DEVICE

(71) Applicant: Huawei Technologies Co., Ltd., Shenzhen (CN)

(72) Inventors: Donghao Liu, Shanghai (CN); Yongsheng Zhang, Shanghai (CN); Wei Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 17/326,006

(22) Filed: May 20, 2021

(65) Prior Publication Data

US 2021/0269018 A1    Sep. 2, 2021

Related U.S. Application Data

(63) Continuation of application No. PCT/CN2020/080531, filed on Mar. 21, 2020.

(30) Foreign Application Priority Data

Aug. 15, 2019    (CN) .......................... 201910754641.9

(51) Int. Cl.
*B60W 30/045*    (2012.01)
*B60W 40/103*    (2012.01)
*B60W 40/114*    (2012.01)

(52) U.S. Cl.
CPC ........ *B60W 30/045* (2013.01); *B60W 40/103* (2013.01); *B60W 40/114* (2013.01);
(Continued)

(58) Field of Classification Search
CPC ............. B60W 30/045; B60W 40/103; B60W 40/114; B60W 2520/06; B60W 2520/10;
(Continued)

(56) References Cited

U.S. PATENT DOCUMENTS 6,909,958 B2 * 6/2005 Post, II ................ F02D 41/021
701/84
9,469,199 B1 * 10/2016 Gauthier ................. B60L 3/106
(Continued)

FOREIGN PATENT DOCUMENTS

CN        103886190 A      6/2014
CN        103935265 A      7/2014
(Continued)

OTHER PUBLICATIONS

Machine translation of CN 103935265 (Year: 2016).*

*Primary Examiner* — Jeff A Burke
*Assistant Examiner* — Mohamad O El Sayah
(74) *Attorney, Agent, or Firm* — Leydig, Voit & Mayer, Ltd.

(57) ABSTRACT

A vehicle stability control method and a vehicle stability control device are provided. The method may be applied to an intelligent automobile field such as intelligent driving or autonomous driving, and is used to control lateral stability of a front axis and rear axis distributed driven vehicle. In this method, a yawing movement of the vehicle is considered, and an additional yawing moment for maintaining lateral stability of the vehicle is provided by compensating for front-axis and rear-axis slip ratios, to control lateral stability of the vehicle and therefore improve stability of the vehicle during driving.

20 Claims, 9 Drawing Sheets

Insufficient steering force for a vehicle

Excessive steering force for a vehicle

(52) U.S. Cl.
CPC ..... *B60W 2520/06* (2013.01); *B60W 2520/10* (2013.01); *B60W 2520/14* (2013.01); *B60W 2520/20* (2013.01); *B60W 2520/403* (2013.01); *B60W 2710/18* (2013.01); *B60W 2720/403* (2013.01)

(58) Field of Classification Search
CPC ......... B60W 2520/14; B60W 2520/20; B60W 2520/403; B60W 2710/18; B60W 2720/403
See application file for complete search history.

(56) References Cited

U.S. PATENT DOCUMENTS

| | | | |
|---|---|---|---|
| 2003/0093190 A1 | 5/2003 | Mori | |
| 2007/0193802 A1* | 8/2007 | Hu | B60K 28/16 180/197 |
| 2008/0086248 A1* | 4/2008 | Lu | B60T 8/17552 701/41 |
| 2011/0307129 A1 | 12/2011 | Yu et al. | |
| 2013/0144476 A1* | 6/2013 | Pinto | B60T 8/17555 903/930 |
| 2014/0257613 A1* | 9/2014 | Tang | B60L 15/20 701/22 |
| 2016/0229291 A1* | 8/2016 | Mao | B60K 23/0808 |
| 2016/0356370 A1* | 12/2016 | Richards | B60W 10/184 |
| 2018/0257477 A1* | 9/2018 | Krueger | B60K 6/52 |
| 2019/0241176 A1* | 8/2019 | Suzuki | B60L 15/20 |
| 2020/0079373 A1* | 3/2020 | Ortmann | B60W 10/08 |
| 2020/0317048 A1* | 10/2020 | Kasaiezadeh Mahabadi | B60K 1/02 |

FOREIGN PATENT DOCUMENTS

| | | | |
|---|---|---|---|
| CN | 104477164 | A | 4/2015 |
| CN | 104828067 | A | 8/2015 |
| CN | 105691241 | A | 6/2016 |
| CN | 103935265 | B * | 10/2016 |
| CN | 106494403 | A | 3/2017 |
| CN | 106585425 | A | 4/2017 |
| CN | 106627580 | A | 5/2017 |
| CN | 106740266 | A | 5/2017 |
| CN | 107303820 | A | 10/2017 |
| CN | 108327713 | A | 7/2018 |
| CN | 108569168 | A | 9/2018 |
| CN | 108791274 | A | 11/2018 |
| CN | 109017747 | A | 12/2018 |
| CN | 109278727 | A | 1/2019 |
| CN | 109291932 | A | 2/2019 |
| CN | 109733205 | A | 5/2019 |
| DE | 102016102004 | A1 | 8/2016 |
| EP | 0421594 | B1 | 10/1995 |
| EP | 2634061 | A2 | 9/2013 |
| EP | 3213971 | A1 | 9/2017 |
| GB | 2480852 | A | 12/2011 |
| JP | 2015112978 | A | 6/2015 |

* cited by examiner

VEHICLE STABILITY CONTROL METHOD AND DEVICE

CROSS-REFERENCE TO RELATED APPLICATIONS

This application is a continuation of International Application No. PCT/CN2020/080531, filed on Mar. 21, 2020, which claims priority to Chinese Patent Application No. 201910754641.9, filed on Aug. 15, 2019. The disclosures of the aforementioned applications are hereby incorporated by reference in their entireties.

TECHNICAL FIELD

Embodiments of this application relate to the field of intelligent automotive technologies, and in particular, to a vehicle stability control method and device.

BACKGROUND

Currently, an electronic stability program (ESP) of a vehicle usually generates a braking force vector on left and right wheels of the vehicle to control to generate an additional yawing moment, to improve vehicle stability. For example, when a steering force for the vehicle is insufficient, the vehicle may perform braking on an inner rear wheel by using the ESP to generate an additional yawing moment in a same direction as a steering direction, to ensure that the vehicle is stable and drives along a trajectory expected by a driver, as shown in a left diagram in FIG. 1. For another example, when the steering force for the vehicle is excessive, the vehicle may perform braking on an outer front wheel by using the ESP to generate an additional yawing moment in a direction opposite to the steering direction, to ensure that the vehicle is stable and drives along the trajectory expected by the driver, as shown in a right diagram in FIG. 1. However, in this method for generating a yawing moment through intervention of a braking force to improve vehicle stability, usually, arranged intervention is comparatively late, and the braking intervention is comparatively strong, thereby degrading use experience of the driver.

Compared with a conventional centralized driven vehicle, a front axis and rear axis distributed driven vehicle has a driving system at each of a front axis and a rear axis, and the two systems are coupled to each other through control. Because torque allocation proportions of the front axis and the rear axis are freer, this driving architecture provides a higher degree of control freedom for cost-effectiveness, power performance, maneuverability, and stability of the vehicle.

Particularly, the torque allocation proportions of the front axis and the rear axis further directly affect a slip ratio of a wheel, thereby affecting a steering characteristic and stability of the vehicle. Therefore, how to control the slip ratio of the wheel to provide the additional yawing moment for maintaining vehicle stability is full of challenges in actual engineering application of the front axis and rear axis distributed driven electric vehicle.

SUMMARY

This application provides a vehicle stability control method and device, to control lateral stability of a front axis and rear axis distributed driven vehicle.

According to a first aspect, this application provides a vehicle stability control method. The method is applicable to the front axis and rear axis distributed driven vehicle shown in FIG. 6, and is performed by a vehicle stability control device (electronic device for short). The method specifically includes the following steps:

When the vehicle is in an unstable state, the electronic device obtains a required yawing moment, a front-axis actual slip ratio, a rear-axis actual slip ratio, a front-axis initial torque, and a rear-axis initial torque of the vehicle at a current time point. Then the electronic device determines a correspondence between a yawing moment of the vehicle and a front-axis slip ratio and a rear-axis slip ratio of the vehicle, and determines a front-axis target slip ratio and a rear-axis target slip ratio based on the required yawing moment and the determined correspondence between the yawing moment and the front-axis slip ratio and the rear-axis slip ratio. Then the electronic device determines a front-axis target torque based on the front-axis initial torque and a difference between the front-axis target slip ratio and the front-axis actual slip ratio; and determines a rear-axis target torque based on the rear-axis initial torque and a difference between the rear-axis target slip ratio and the rear-axis actual slip ratio. Finally, the electronic device may control stability of the vehicle based on the front-axis target torque and the rear-axis target torque.

In this method, when the vehicle is in an unstable state, the electronic device may obtain the front-axis actual slip ratio and the rear-axis actual slip ratio, and then quickly and accurately obtain a front-axis target slip ratio and a rear-axis target slip ratio that meet a current driving status. Further, the electronic device may determine, based on the difference between the front-axis target slip ratio and the front-axis actual slip ratio and the difference between the rear-axis target slip ratio and the rear-axis actual slip ratio, a front-axis target torque and a rear-axis target torque that can ensure stability of the vehicle. Further, the electronic device may control stability of the vehicle. In this method, a yawing movement of the vehicle is considered, and an additional yawing moment for maintaining lateral stability of the vehicle is provided by compensating for front-axis and rear-axis slip ratios, to control lateral stability of the vehicle and therefore improve stability of the vehicle during driving. In addition, because the front-axis target slip ratio and the rear-axis target slip ratio are obtained based on the required yawing moment of the vehicle at the current time point, a front-axis target slip ratio and a rear-axis target slip ratio that are calculated in real time better meet a driving status of the vehicle at the current time point. In other words, regardless of a driving manner used for the vehicle during stability control, vehicle stability can be quickly and accurately ensured by using this method.

In a possible design, the electronic device may further determine a status of the vehicle by using, but not limited to, the following methods:

Method 1: The electronic device determines the status of the vehicle based on an angular velocity error between an actual yawing angular velocity and a target yawing angular velocity of the vehicle at the current time point.

Method 2: The electronic device may determine the status of the vehicle based on driving parameters of the vehicle, for example, a longitudinal driving speed, a lateral driving speed, a side slip angle of a center of mass of the vehicle, a longitudinal acceleration, and a lateral acceleration, and by analyzing the foregoing parameters.

With this design, the electronic device can accurately determine the status of the vehicle.

In a possible design, the electronic device may determine the status of the vehicle based on the angular velocity error between the actual yawing angular velocity and the target yawing angular velocity of the vehicle by using the following steps:

The electronic device obtains the longitudinal driving speed, a wheel steering angle, and the actual yawing angular velocity of the vehicle at the current time point. The electronic device determines the target yawing angular velocity based on the longitudinal driving speed, the wheel steering angle, and a stored steering characteristic factor. The electronic device calculates the angular velocity error between the actual yawing angular velocity and the target yawing angular velocity. When the angular velocity error does not fall within a threshold interval formed by a first threshold and a second threshold, the electronic device determines that the vehicle is in an unstable state; otherwise, the electronic device determines that the vehicle is in a stable state. The actual yawing angular velocity can represent an actual driving trajectory of the vehicle when a working condition of the vehicle remains unchanged. The target yawing angular velocity is used to represent a trajectory expected by a driver of the vehicle. The first threshold is a positive number, and the second threshold is a negative number.

With this design, the electronic device can accurately determine the status of the vehicle based on a current driving status of the vehicle.

In a possible design, the target yawing angular velocity meets the following formula:

$$\gamma_d(t) = \frac{v_x(t)\delta(t)}{(l_f + l_r)(1 + Kv_x(t)^2)}$$

where $\gamma_d(t)$ is the target yawing angular velocity, $v_x(t)$ is the longitudinal driving speed, $\delta(t)$ is the wheel steering angle, $l_f$ is a distance from the center of mass of the vehicle to a front axis, $l_r$ is a distance from the center of mass of the vehicle to a rear axis, K is the steering characteristic factor, and t is the current time point.

With this design, the electronic device can accurately calculate the target yawing angular velocity of the vehicle.

In a possible design, the electronic device may determine the required yawing moment based on the angular velocity error.

For example, when the angular velocity error is greater than the first threshold, the required yawing moment meets the following formula:

$$M(t) = -\text{sign}(\delta(t)) * \left( K_{Po} e_\gamma(t) + K_{Io} \int_{t_0}^{t} e_\gamma(t) + K_{Do} \frac{de_\gamma(t)}{dt} \right)$$

For example, when the angular velocity error is less than the second threshold, the required yawing moment meets the following formula:

$$M(t) = \text{sign}(\delta(t)) * \left( K_{Pu} e_\gamma(t) + K_{Iu} \int_{t_0}^{t} e_\gamma(t) + K_{Du} \frac{de_\gamma(t)}{dt} \right)$$

where M(t) is the required yawing moment, $\text{sign}(\delta(t))$ is a sign function, $\delta(t)$ is the wheel steering angle, $e_\gamma(t)$ is a difference between the actual yawing angular velocity and the target yawing angular velocity, $K_{Po}$ is a proportional module gain coefficient of the vehicle in case of oversteering, $K_{Io}$ is an integral module gain coefficient of the vehicle in case of oversteering, $K_{Do}$ is a differential module gain coefficient of the vehicle in case of oversteering, $t_0$ is a time point at which the vehicle is in an unstable state, t is the current time point, $K_{Pu}$ is a proportional module gain coefficient of the vehicle in case of understeering, $K_{Iu}$ is an integral module gain coefficient of the vehicle in case of understeering, and $K_{Du}$ is a differential module gain coefficient of the vehicle in case of understeering.

With this design, the electronic device can accurately calculate a required yawing moment that can make the vehicle stable.

For example, the angular velocity error meets the following formula:

$$e_\gamma(t) = \begin{cases} |\gamma(t)| - |\gamma_d(t)| & \gamma(t)\gamma_d(t) > 0 \\ |\gamma(t) - \gamma_d(t)| & \gamma(t)\gamma_d(t) < 0 \end{cases}$$

where $e_\gamma(t)$ is the angular velocity error, $\gamma(t)$ is the actual yawing angular velocity, and $\gamma_d(t)$ is the target yawing angular velocity.

In a possible design, the electronic device may obtain the front-axis actual slip ratio $\lambda_f(t)$ and the rear-axis actual slip ratio $\lambda_r(t)$ of the vehicle at the current time point by using the following steps:

First, the electronic device obtains the longitudinal acceleration $a_x(t)$, the lateral acceleration $a_y(t)$, a wheel speed $\omega_i(t)$, the actual yawing angular velocity $\gamma(t)$, and the wheel steering angle $\delta(t)$ of the vehicle at the current time point. Then the electronic device first calculates the longitudinal driving speed $v_x(t)$ based on the foregoing parameters, and then calculates actual slip ratios $\lambda_i(t)$ of four wheels based on the longitudinal driving speed $v_x(t)$ and the wheel speed $\omega_i(t)$ according to a conventional wheel slip ratio calculation method, where i=1, 2, 3, 4 indicates a left front wheel, a right front wheel, a left rear wheel, and a right rear wheel respectively. Finally, the electronic device calculates the front-axis actual slip ratio $\lambda_f(t)=\lambda_1(t)+\lambda_2(t)$, and calculates the rear-axis actual slip ratio $\lambda_r(t)=\lambda_3(t)+\lambda_4(t)$.

With this design, the electronic device can accurately determine the front-axis actual slip ratio and the rear-axis actual slip ratio based on a current driving status of the vehicle.

In a possible design, in a manual driving scenario, the electronic device may calculate the front-axis initial torque $T_{f0}$ and the rear-axis initial torque $T_{r0}$ according to an optimal-power or optimal-energy method and based on opening degrees of an accelerator pedal and a brake pedal in a driver input apparatus, and a gear position output by a manual gear rocker and/or an automatic gear controller.

With this design, the electronic device can accurately calculate the front-axis initial torque and the rear-axis initial torque based on data output by the driver input apparatus.

In a possible design, in an automatic driving scenario, the electronic device may calculate the front-axis initial torque $T_{f0}$ and the rear-axis initial torque $T_{r0}$ according to a braking or driving requirement output by an ADAS. With this design, the electronic device can accurately calculate the front-axis initial torque and the rear-axis initial torque in the automatic driving scenario.

In a possible design, the electronic device determines the correspondence between the yawing moment of the vehicle and the front-axis slip ratio and the rear-axis slip ratio of the vehicle by using the following steps:

First, the electronic device obtains the wheel steering angle, a front-axis side slip angle, a rear-axis side slip angle, a front-axis vertical force, and a rear-axis vertical force of the vehicle at the current time point. Then the electronic device establishes the correspondence between the yawing moment and the front-axis slip ratio and the rear-axis slip ratio based on the wheel steering angle, the front-axis side slip angle, the rear-axis side slip angle, the front-axis vertical force, the rear-axis vertical force, and a stored target correspondence. The target correspondence is determined based on a correspondence between a front-axis lateral force and the front-axis slip ratio, a front and rear side slip angle, and a front-axis vertical force, a correspondence between a rear-axis lateral force and the rear-axis slip ratio, a rear-axis side slip angle, and a rear-axis vertical force, and a correspondence between the yawing moment and a vehicle steering angle, the front-axis lateral force, and the rear-axis lateral force.

The correspondence between the front-axis lateral force and the front-axis slip ratio, the front-axis side slip angle, and the front-axis vertical force, and the correspondence between the rear-axis lateral force and the rear-axis slip ratio, the rear-axis side slip angle, and the rear-axis vertical force are obtained through linear analysis on a relationship between a lateral force and a yawing angular velocity. The correspondence between the yawing moment and the vehicle steering angle, the front-axis lateral force, and the rear-axis lateral force is determined by analyzing a two-degree-of-freedom vehicle model. Therefore, with this design, the electronic device can accurately establish the correspondence between the yawing moment and the front-axis slip ratio and the rear-axis slip ratio.

For example, the correspondence between the yawing moment and the front-axis slip ratio and the rear-axis slip ratio meets the following formula:

$$M = \cos\delta(C_{1f}|\lambda_{fd}| + C_{0f})\alpha_f F_{zf} l_f - (C_{1r}|\lambda_{rd}| + C_{0r})\alpha_r F_{zr} l_r$$

where M is the yawing moment, $\delta$ is the wheel steering angle, $C_{1f}$ and $C_{0f}$ are linearization coefficients of a front-axis equivalent wheel model, $C_{1r}$ and $C_{0r}$ are linearization coefficients of a rear-axis equivalent wheel, $\lambda_{fd}$ is the front-axis slip ratio, $\lambda_{rd}$ is the rear-axis slip ratio, $\alpha_f$ is the front-axis side slip angle, $\alpha_r$ is the rear-axis side slip angle, $F_{zf}$ is the front-axis vertical force, $F_{zr}$ is the rear-axis vertical force, $l_f$ is the distance from the center of mass of the vehicle to the front axis, and $l_r$ is the distance from the center of mass of the vehicle to the rear axis.

In a possible design, the electronic device may determine the front-axis target slip ratio and the rear-axis target slip ratio by using the following steps:

First, the electronic device determines a plurality of slip ratio combinations based on the required yawing moment and the correspondence between the yawing moment and the front-axis slip ratio and the rear-axis slip ratio. Each slip ratio combination includes one front-axis slip ratio and one rear-axis slip ratio. Then the electronic device selects, from the plurality of slip ratio combinations, at least one slip ratio combination in which the front-axis slip ratio and the rear-axis slip ratio are less than 0. Then the electronic device selects, from the at least one slip ratio combination, a target slip ratio combination in which a sum of an absolute value of the front-axis slip ratio and an absolute value of the rear-axis slip ratio is smallest. Finally, the electronic device determines the front-axis slip ratio in the target slip ratio combination as the front-axis target slip ratio, and determines the rear-axis slip ratio in the target slip ratio combination as the rear-axis target slip ratio.

It can be learned from the foregoing formula that the electronic device can obtain a plurality of groups of solutions based on the required yawing moment and the correspondence between the yawing moment and the front-axis slip ratio and the rear-axis slip ratio, and the plurality of groups of solutions include both a positive value and a negative value. In addition, it is learned that braking processing can be performed on the vehicle, to ensure driving safety of the vehicle. When the vehicle is in a braking mode, a slip ratio of the vehicle is less than 0. It is further learned that a smaller absolute value of a slip ratio of the vehicle indicates a better braking effect. Therefore, to find an optimal solution in the plurality of groups of solutions, the electronic device may use, as two constraint conditions, that the front-axis slip ratio and the rear-axis slip ratio are less than 0 and that a sum of an absolute value of the front-axis slip ratio and an absolute value of the rear-axis slip ratio is smallest. In this way, a front-axis target slip ratio and a rear-axis target slip ratio that are finally obtained by the electronic device can ensure driving safety of the vehicle.

In a possible design, the front-axis target torque meets the following formula:

$$T_f(t) = T_{f0} + K_P e_{\lambda f}(t) + K_I \int_{t_0}^{t} e_{\lambda f}(t) + K_D \frac{de_{\lambda f}(t)}{dt};$$

the rear-axis target torque meets the following formula:

$$T_r(t) = T_{r0} + K_P e_{\lambda r}(t) + K_I \int_{t_0}^{t} e_{\lambda r}(t) + K_D \frac{de_{\lambda r}(t)}{dt}$$

where $T_f(t)$ is the front-axis target torque, $T_{f0}$ is the front-axis initial torque, $e_{\lambda f}(t)$ is the difference between the front-axis target slip ratio and the front-axis actual slip ratio, $T_r(t)$ is the rear-axis target torque, $T_{r0}$ is the rear-axis initial torque, $e_{\lambda r}(t)$ is the difference between the rear-axis target slip ratio and the rear-axis actual slip ratio, $K_P$ is a proportional module gain coefficient, $K_I$ is an integral module gain coefficient, $K_D$ is a differential module gain coefficient, $t_0$ is a time point at which the vehicle is in an unstable state, and t is the current time point.

With this design, the electronic device can accurately calculate the front-axis target torque and the rear-axis target torque, so that the electronic device can control stability of the vehicle based on the front-axis target torque and the rear-axis target torque.

According to a second aspect, an embodiment of this application provides a vehicle stability control device, including units configured to perform the steps in the first aspect.

According to a third aspect, an embodiment of this application provides a vehicle stability control device, including at least one processing element and at least one storage element. The at least one storage element is configured to store a program and data. The at least one processing element is configured to perform the method provided in the first aspect of this application.

According to a fourth aspect, an embodiment of this application further provides a computer program. When the computer program runs on a computer, the computer is enabled to perform the method provided in the first aspect.

According to a fifth aspect, an embodiment of this application further provides a computer storage medium. The computer storage medium stores a computer program. When the computer program is executed by a computer, the computer is enabled to perform the method provided in the first aspect.

According to a sixth aspect, an embodiment of this application further provides a chip. The chip is configured to read a computer program stored in a memory, and to perform the method provided in the first aspect.

According to a seventh aspect, an embodiment of this application further provides a chip system. The chip system includes a processor, configured to support a computer apparatus in implementing the method provided in the first aspect. In a possible design, the chip system further includes a memory. The memory is configured to store a program and data that are necessary for the computer apparatus. The chip system may include a chip, or may include a chip and another discrete device.

DESCRIPTION OF EMBODIMENTS

This application provides a vehicle stability control method and device, to control a slip ratio of a wheel to provide a front axis and rear axis distributed driven electric vehicle with an additional yawing moment for maintaining vehicle stability, to control lateral stability of the front axis and rear axis distributed driven vehicle. The method and the device are based on a same inventive concept. Because a problem-resolving principle of the method is similar to that of the device, mutual reference may be made to implementations of the method and the device, and repeated description is not provided.

In the following, some terms in this application are described, to help persons skilled in the art have a better understanding.

(1) A working condition of a vehicle, namely, a working condition of a vehicle, may also be referred to as a steering characteristic of the vehicle. There are mainly three working conditions: neutral steering, understeering, and oversteering.

Figure 1:
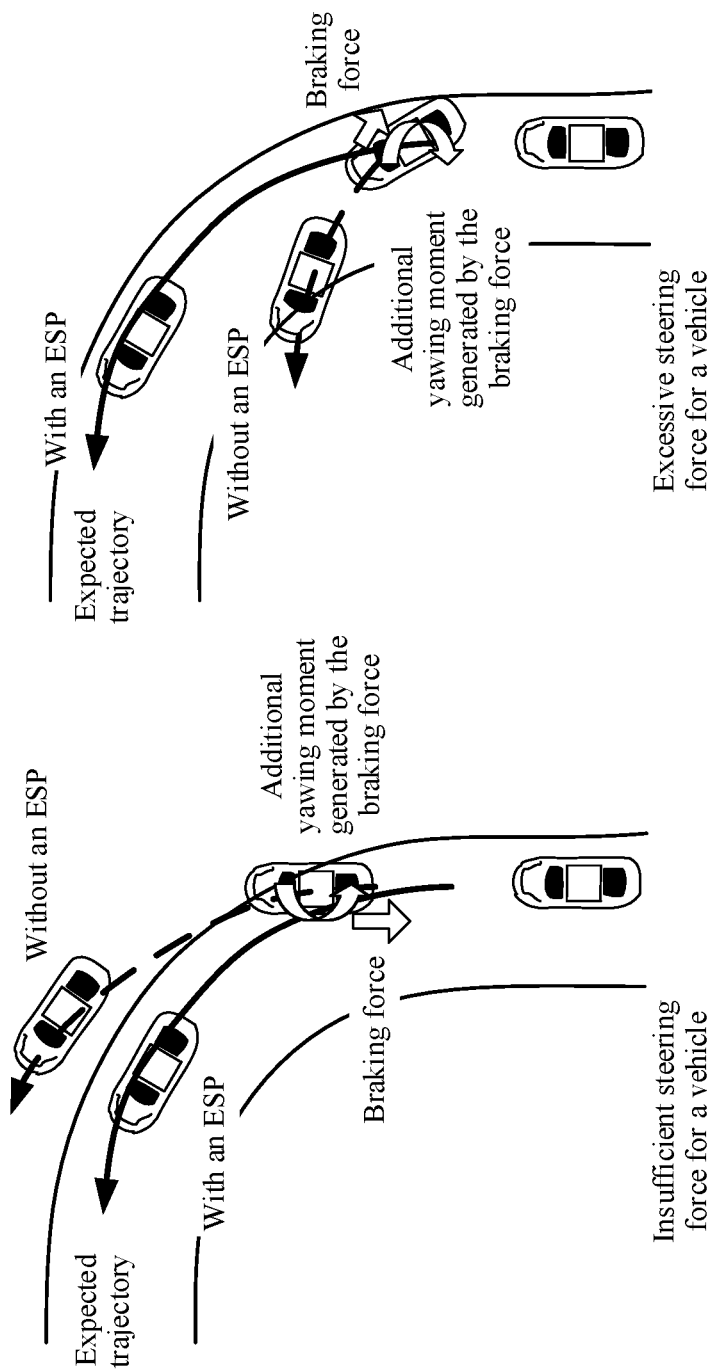
FIG. 1 is a schematic diagram of a vehicle steering characteristic according to an embodiment of this application.

The neutral steering means that a steering angle is not required to change when a driving speed changes during equi-radius steering. The understeering means that the steering angle gradually increases as the driving speed increases during equi-radius steering. Therefore, when a vehicle with a comparatively high driving speed turns, a driving trajectory deviates outward because the steering angle is comparatively large, as indicated by a dashed line in a left diagram in FIG. 1. The oversteering means that the steering angle gradually decreases as the driving speed increases during equi-radius steering. Therefore, when the vehicle with the comparatively high driving speed turns, the driving trajectory deviates inward because the steering angle is comparatively small, as indicated by a dashed line in a right diagram in FIG. 1.

(2) A vehicle has two states: an unstable state and a stable state. Usually, the status of the vehicle may be determined based on an angular velocity error between an actual yawing angular velocity of the vehicle and a target yawing angular velocity used to represent a trajectory expected by a driver.

When the angular velocity error is greater than a first threshold or less than a second threshold, the vehicle is in an unstable state. When the angular velocity error is between the second threshold and the first threshold, the vehicle is in a stable state. Details are shown in the following formula:

$$e_\gamma \in \begin{cases} (thd1, \infty) & \text{Unstable} \\ [thd2, thd1] & \text{Stable} \\ (-\infty, thd2) & \text{Unstable} \end{cases}$$

where $e_\gamma$ is the angular velocity error, thd1 is the first threshold, thd1 is a positive number, thd2 is the second threshold, and thd2 is a negative number.

Certainly, currently, there are still many other methods for determining an operating status of the vehicle. For example, the operating status of the vehicle is determined based on parameters such as a longitudinal driving speed, a lateral driving speed, a side slip angle of a center of mass of the vehicle, a longitudinal acceleration, and a lateral acceleration. A specific process is not described in this application.

(3) An angular velocity error between an actual yawing angular velocity and a target yawing angular velocity is used to determine whether an actual status of a vehicle meets a status expected by a driver, that is, determine whether the vehicle is in an unstable state. In this application, the angular velocity error may be determined by using the following formula:

$$e_\gamma = \begin{cases} |\gamma| - |\gamma_d| & \gamma * \gamma_d > 0 \\ |\gamma - \gamma_d| & \gamma * \gamma_d < 0 \end{cases}$$

where $e_\gamma$ is the angular velocity error, $\gamma$ is the actual yawing angular velocity, and $\gamma_a$ is the target yawing angular velocity.

Figure 2:
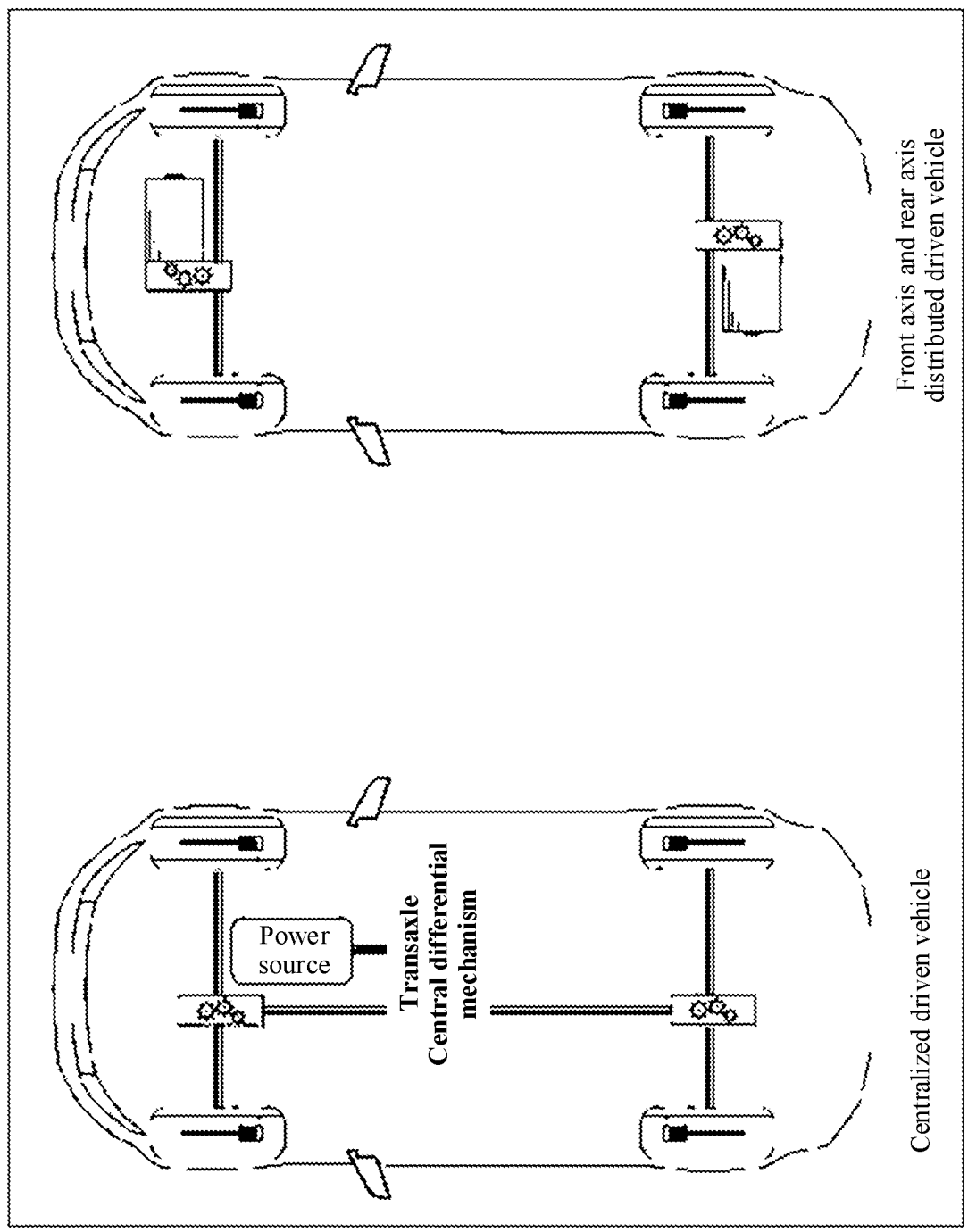
FIG. 2 is a schematic diagram of a comparison between different driving architectures according to an embodiment of this application.

(4) A front axis and rear axis distributed driven vehicle is proposed relative to a conventional centralized driven vehicle architecture. As shown in FIG. 2, different from a central differential mechanical structure of a centralized driven vehicle, the front axis and rear axis distributed driven vehicle has a driving system at each of a front axis and a rear axis, and the two systems are coupled to each other through control, without a hardware connection by using a dedicated mechanical structure. Compared with the centralized driven vehicle, the front axis and rear axis distributed driven vehicle may freely switch between front-wheel driving, rear-wheel driving, and four-wheel driving. In addition, in a four-wheel driven mode, because a driving/braking torque of a motor can be separately, accurately, and quickly controlled, torque allocation proportions of a front axis and a rear axis are freer. Therefore, this driving architecture provides a higher degree of control freedom for cost-effectiveness, power performance, maneuverability, and stability of the vehicle. Currently, many vehicle manufacturers use this driving architecture for manufacturing vehicles.

Figure 3:
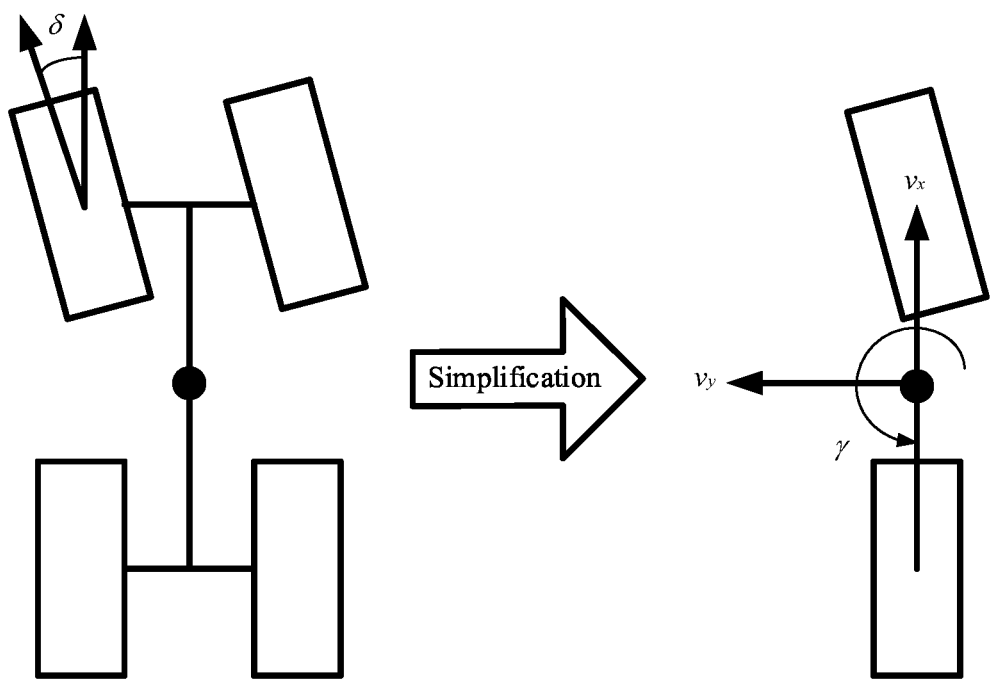
FIG. 3 is a schematic diagram of a two-degree-of-freedom vehicle model according to an embodiment of this application.

(5) A two-degree-of-freedom vehicle model is a simplification of a whole vehicle model of a vehicle under an assumption that a longitudinal driving speed of the vehicle is uniform. Two degrees of freedom are involved: a lateral (namely, transverse) movement of the vehicle and a yawing movement of the vehicle. A simplification process and a coordinate system definition are shown in FIG. 3. A black dot in the figure indicates a center of mass of the vehicle, and a block indicates a wheel.

$\delta$ is a wheel steering angle of the vehicle, v is a longitudinal driving speed, $v_y$ is a lateral driving speed, and $\gamma$ is a yawing angular velocity of the vehicle.

Based on movement and force bearing analysis of the two-degree-of-freedom vehicle model, when the vehicle is stable, both the longitudinal driving speed v and the yawing angular velocity $\gamma$ are fixed values, and an equation set of dynamics equations corresponding to the lateral movement and the yawing movement is as follows:

$$(k_f + k_r)\frac{v_y}{v_x} + (l_f k_f - l_r k_r)\frac{\gamma}{v_x} - k_f \delta = m v_x \gamma \quad (1)$$

$$(l_f k_f - l_r k_r)\frac{v_y}{v_x} + (l_f^2 k_f + l_r^2 k_r)\frac{\gamma}{v_x} - l_f k_f \delta = 0 \quad (2)$$

where $v_x$(m/s) is the longitudinal driving speed of the vehicle, $v_y$(m/s) is the lateral driving speed of the vehicle, the longitudinal driving speed $v_x$ is a fixed value, the lateral driving speed $v_y$ is a variable, $k_f$(N/rad), $k_r$(N/rad) are equivalent cornering stiffnesses of a front wheel and a rear wheel respectively and are determined based on a feature of the wheels, $l_f$(m), $l_r$(m) are distances from the center of mass to a front axis and a rear axis respectively, and m(kg) is a whole vehicle mass of the vehicle. It should be noted that units of corresponding parameters are included in parentheses of the foregoing parameters.

A formula for the target yawing angular velocity may be obtained based on the foregoing formulas and through the following derivation:

The following formula (3) may be obtained based on the formula (2):

$$\frac{v_y}{v_x} = -\frac{(l_f^2 k_f + l_r^2 k_r)}{(l_f k_f - l_r k_r)}\frac{\gamma}{v_x} + \frac{l_f k_f}{(l_f k_f - l_r k_r)}\delta \quad (3)$$

The following formula (4) may be obtained by substituting (3) into the formula (1):

$$(k_f + k_r)\left(-\frac{(l_f^2 k_f + l_r^2 k_r)}{(l_f k_f - l_r k_r)}\frac{\gamma}{v_x} + \frac{l_f k_f}{(l_f k_f - l_r k_r)}\delta\right) + \quad (4)$$

$$(l_f k_f - l_r k_r)\frac{\gamma}{v_x} - k_f \delta = m v_x \gamma$$

A formula (5) may be obtained by simplifying the formula (4):

$$\frac{\gamma}{\delta} = \frac{v_x/(l_f + l_r)}{1 + \frac{m}{(l_f + l_r)^2}\left(\frac{l_f}{k_r} - \frac{l_r}{k_f}\right)v_x^2} \quad (5)$$

When the vehicle is stationary, m, $l_f$, $l_r$, $k_r$, and $k_f$ are all fixed parameters, and are not related to variables such as a driving speed and a vehicle steering angle. Therefore, $$\frac{m}{(l_f + l_r)^2}\left(\frac{l_f}{k_r} - \frac{l_r}{k_f}\right)$$

in the formula (5) may be defined as a steering characteristic factor K. It should be noted that, when the vehicle is stationary, all parameters related to K are fixed parameters. In other words, when the vehicle is stationary, K of the vehicle is also a fixed constant value. Therefore, an in-vehicle processor capable of implementing a vehicle stability control method may store a value of K, so that the value may be directly used for subsequently calculating the target yawing angular velocity, thereby improving calculation efficiency.

In this way, the formula (5) may be simplified into a formula (6) based on the definition of K:

$$\gamma = \frac{v_x \delta}{(l_f + l_r)(1 + K v_x^2)} \quad (6)$$

Based on the foregoing calculation methods, the formula (6) for calculating the target yawing angular velocity may be obtained by using the two-degree-of-freedom vehicle model.

(6) A correspondence between a yawing moment and a vehicle steering angle, a front-axis (wheel) lateral force, and a rear-axis (wheel) lateral force may be determined by using the foregoing two-degree-of-freedom vehicle model.

Figure 4:
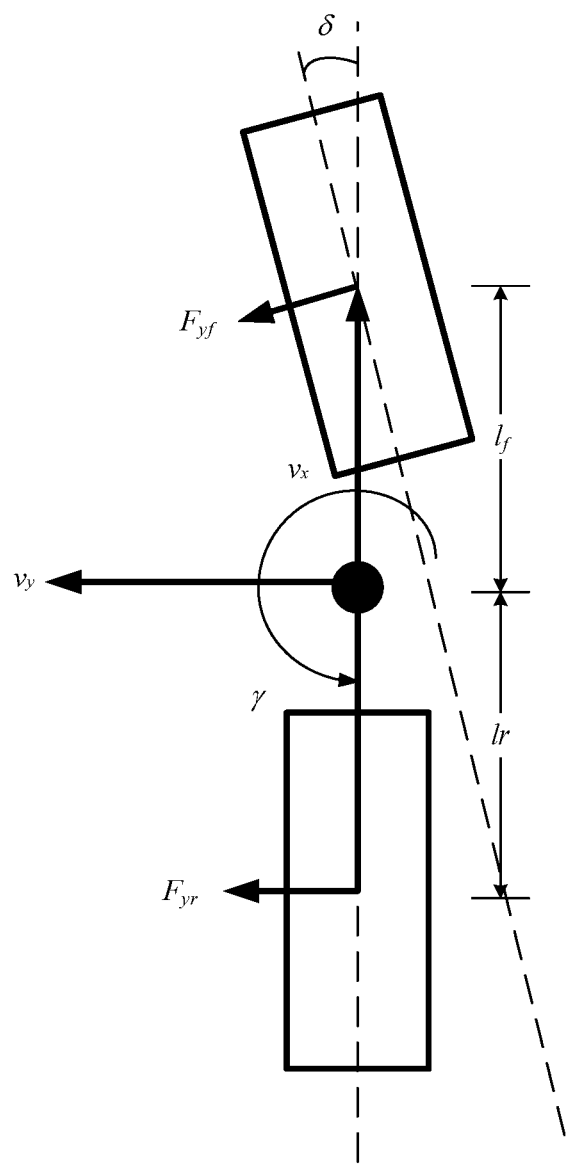
FIG. 4 is a schematic diagram of a correspondence between a yawing moment and a lateral force of a two-degree-of-freedom vehicle model according to an embodiment of this application.

As shown in FIG. 4, a positive yawing moment generated by a front-axis lateral force relative to a center of mass is $\cos \delta \, F_{yf} l_f$, and a negative yawing moment generated by a rear-axis lateral force relative to the center of mass is $-F_{yr} l_r$. Therefore, the yawing moment of the vehicle is a sum of the positive yawing moment and the negative yawing moment, as shown in a formula (7):

$$M = \cos \delta \, F_{yf} l_f - F_{yr} l_r \quad (7)$$

(7) A correspondence between a lateral force and a slip ratio, a side slip angle, and a vertical force specifically includes a correspondence between a front-axis lateral force and a front-axis slip ratio, a front-axis side slip angle, and a front-axis vertical force, and a correspondence between a rear-axis lateral force and a rear-axis slip ratio, a rear-axis side slip angle, and a rear-axis vertical force.

In this application, the correspondence may be determined by linearizing a relationship between a lateral force and a yawing angular velocity (that is, a locally linear wheel model). The following steps are specifically included:

a. A lateral force $F_y$(N) of a wheel is usually determined by a slip ratio $\lambda(-)$ of the wheel, a side slip angle $\alpha$(deg) of the wheel, and a vertical force $F_z$(N) of the wheel. It should be noted that units of corresponding parameters are included in parentheses of the foregoing parameters.

Figure 5:
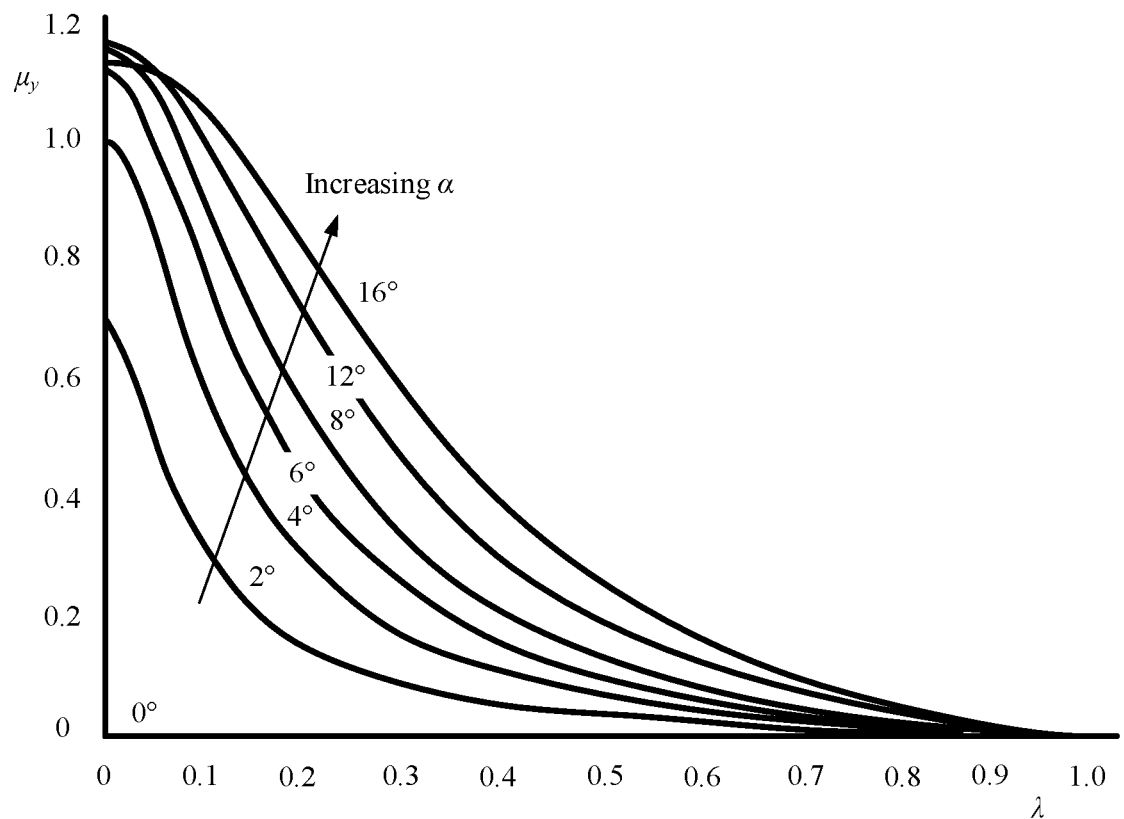
FIG. 5 is a schematic diagram of a function curve of a lateral attachment coefficient according to an embodiment of this application.

First, it is assumed that a lateral force of a wheel is in a linearly proportional relationship with a vertical force of the wheel, as shown in a formula (8):

$$F_y = \mu_y F_z = \mu_y(\lambda, \alpha) F_z \qquad (8)$$

where $\mu_y(-)$ is a lateral attachment coefficient, and is a nonlinear function of a slip ratio $\lambda$ of the wheel and a side slip angle $\alpha$ of the wheel, and a nonlinear function relationship thereof is shown in FIG. 5.

b. Usually, the slip ratio of the wheel is not greater than 0.3 under an effect of an antilock brake system (ABS)/traction control system (TCS). In this slip ratio interval, the lateral attachment coefficient $\mu_y$ decreases approximately linearly as the slip ratio $\lambda$ increases, and a relationship between the lateral attachment coefficient $\mu_y$ and the side slip angle $\alpha$ of the wheel may be approximately a directly proportional relationship. Therefore, when the slip ratio is less than 0.3, the lateral force of the wheel may be linearized into a formula (9):

$$F_y = (C_1\lambda + C_0)\alpha F_z, \lambda \in [0\ 0.3] \qquad (9)$$

where $C_1$ and $C_0$ are linearization coefficients.

c. In practice, there are two working conditions for a slip ratio of a wheel: a driving working condition and a braking working condition. In this case, the slip ratio of the wheel is defined as a formula (10):

$$\lambda_i = \frac{v_x - \omega_i R_w}{\max(v_x, \omega_i R_w)} \qquad (10)$$

where $R_w$ is a wheel radius (assuming that radii of four wheels are the same), $\lambda_i$ is particularly a slip ratio of each wheel, i=1, 2, 3, 4 indicates a left front wheel, a right front wheel, a left rear wheel, and a right rear wheel respectively, and when a wheel is in a driving working condition, $\lambda_i$ is a positive number and is within [0 1], or when a wheel is in a braking working condition, $\lambda_i$ is a negative number and is within [−1 0].

The lateral force of the wheel in step b is considered in a scenario of $\lambda_i \geq 0$ by default, and it is assumed that wheel models corresponding to the braking working condition and the driving working condition are symmetric. Therefore, a wheel linearization model may be finally represented as a formula (11):

$$F_y = (C_1|\lambda| + C_0)\alpha F_z, \lambda \in [-0.3\ 0.3\ ] \qquad (11)$$

A correspondence between a front-axis lateral force and a front-axis slip ratio, a front-axis side slip angle, and a front-axis vertical force may be obtained based on the formula (11), as shown in a formula (12):

$$F_{yf} = (C_{1f}|\lambda_{fd}| + C_{0f})\alpha_f F_{zf} \qquad (12)$$

where $C_{1f}$ and $C_{0f}$ are linearization coefficients of a front-axis equivalent wheel model, $\lambda_{fd}$ is an equivalent front-axis slip ratio, $\alpha_f$ of is a front-axis side slip angle, $$\alpha_f = \frac{\alpha_1 + \alpha_2}{2},$$

$\alpha_1$ is a side slip angle of the left front wheel, $\alpha_2$ is a side slip angle of the right front wheel, $F_{zf}$ is a front-axis vertical force, $F_{zf} = F_{z1} + F_{z2}$, $F_{z1}$ is a vertical force of the left front wheel, and $F_{z2}$ is a vertical force of the right front wheel.

Likewise, a correspondence between a rear-axis lateral force and a rear-axis slip ratio, a rear-axis side slip angle, and a rear-axis vertical force may be further obtained based on the formula (11), as shown in a formula (13):

$$F_{yr} = (C_{1r}|\lambda_{fd}| + C_{0r})\alpha_r F_{zr} \qquad (13)$$

where $C_{1r}$ and $C_{0r}$ are linearization coefficients of a rear-axis equivalent wheel model, $\lambda_{rd}$ is an equivalent rear-axis slip ratio, $\alpha_r$ is a rear-axis side slip angle, $$\alpha_r = \frac{\alpha_3 + \alpha_4}{2},$$

$\alpha_3$ is a side slip angle of the left rear wheel, $\alpha_4$ is a side slip angle of the right rear wheel, $F_{zr}$ is a rear-axis vertical force, $F_{zr} = F_{z3} + F_{z4}$, $F_{z3}$ is a vertical force of the left rear wheel, and $F_{z4}$ is a vertical force of the right rear wheel.

It should be noted that the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In this application, "a plurality of" refers to two or more than two.

In addition, it should be understood that, in descriptions of this application, terms such as "first" and "second" are merely used for differentiation and description, but not be understood as an indication or implication of relative importance, or an indication or implication of an order.

The following further illustrates the embodiments of this application in detail with reference to drawings of this specification.

The vehicle stability control method provided in the embodiments of this application may be applied to a front axis and rear axis distributed driven vehicle. Specifically, the vehicle stability control method may be carried in a separate in-vehicle electronic device (which may also be referred to as a vehicle stability control device) or coupled to a conventional vehicle stability control system or vehicle braking system such as an ESP. This is not limited in this application.

Figure 6:
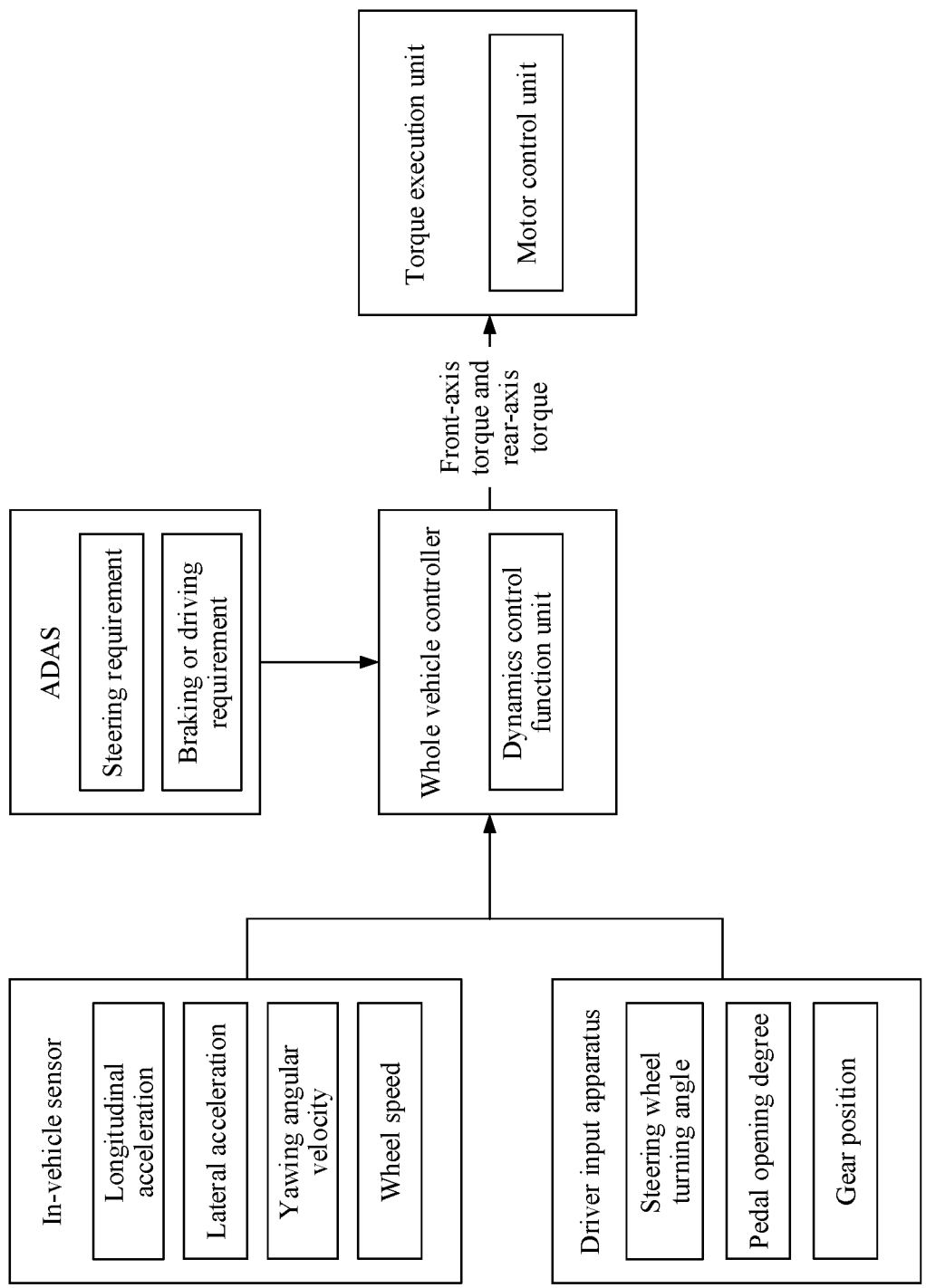
FIG. 6 is a diagram of a system architecture of a front axis and rear axis distributed driven vehicle according to an embodiment of this application.

Referring to a diagram of a system architecture of a front axis and rear axis distributed driven vehicle shown in FIG. 6, the vehicle may include an in-vehicle sensor, a driver input apparatus, an advanced driver assistance system (ADAS), a whole vehicle controller, a torque execution unit, and the like.

The vehicle sensor is configured to collect parameters such as a longitudinal acceleration $a_x$(m/s$^2$), a lateral acceleration $a_y$(m/s$^2$), a yawing angular velocity $\gamma$(rad/s), a wheel speed $\omega_i$(rad/s) of the vehicle in real time. i=1, 2, 3, 4 indicates a left front wheel, a right front wheel, a left rear wheel, and a right rear wheel respectively. Units of corresponding parameters are included in parentheses of the foregoing parameters.

The ADAS is applied to an automatic driving scenario, and includes a trajectory tracking controller. The trajectory tracking controller can automatically detect a steering requirement (that is, a wheel steering angle δ) and a braking or driving requirement (that is, an acceleration or deceleration requirement) of the vehicle.

The driver input apparatus is applied to a manual driving scenario, and may specifically include a steering wheel, an accelerator pedal, a brake pedal, a manual gear rocker, an automatic gear controller, and the like. The driver input apparatus is configured to receive a driving intention of a driver, and generate corresponding data. For example, after the driver operates the steering wheel, the steering wheel obtains a steering wheel turning angle $\delta_{SW}$(rad).

The whole vehicle controller has a dynamics control function, and can control driving, stability, and the like of the vehicle. Further, the whole vehicle controller may include a dynamics control function unit, configured to perform the vehicle stability control method provided in the embodiments of this application.

The whole vehicle controller may obtain various types of data from the in-vehicle sensor, the driver input apparatus, and the ADAS, and process the obtained data by using the dynamics control function unit, to control maneuverability and stability of the vehicle. For example, the dynamics control function unit processes the obtained data, determines whether the vehicle is in a stable state, and when the vehicle is unstable, calculates a control amount for the vehicle and converts the control amount into front-axis and rear-axis (that is, wheels) driving/braking torque requirements (that is, a front-axis torque and a rear-axis torque).

The torque execution unit may be configured to receive the front-axis and rear-axis driving/braking torque requirements from the whole vehicle controller, and then control a front-axis motor and a rear-axis motor according to the torque requirements, to exert a braking or driving torque on a front axis and a rear axis, and therefore control maneuverability and stability of the vehicle. Optionally, the torque execution unit may include a motor control unit configured to control a motor.

Optionally, there may be one or two motor control units. When there is one motor control unit, the motor control unit may control the front-axis motor and the rear-axis motor. When there are two motor control units, different motor control units may control different motors separately.

It should be noted that the system architecture shown in FIG. 6 does not constitute a limitation on a front axis and rear axis distributed driven vehicle to which the embodiments of this application are applicable, and the front axis and rear axis distributed driven vehicle may include more or fewer components. For example, when the front axis and rear axis distributed driven vehicle does not have an automatic driving function, the front axis and rear axis distributed driven vehicle does not include the ADAS. For another example, when the front axis and rear axis distributed driven vehicle has only an automatic driving function but no manual driving function, the front axis and rear axis distributed driven vehicle does not include a driver input apparatus. For still another example, when the front axis and rear axis distributed driven vehicle has both the automatic driving function and the manual driving function, the front axis and rear axis distributed driven vehicle includes the ADAS and the driver input apparatus.

In addition, it should be further noted that, in the embodiments of this application, a parameter that can change in real time may be denoted as a function with time t as a variable, and t may indicate a current time point. Certainly, a parameter calculated or estimated based on the function with t as a variable may also be denoted as a function with t as a variable.

For example, in the system architecture shown in FIG. 6, the longitudinal acceleration, the lateral acceleration, the yawing angular velocity, and the wheel speed that are measured by the in-vehicle sensor and the steering wheel turning angle output by the steering wheel may be denoted as $a_x(t)$, $a_y(t)$, $\gamma(t)$, $\omega_r(t)$, and $\delta_{SW}(t)$ respectively.

A wheel steering angle calculated by using the steering wheel turning angle or output by the ADAS is denoted as $\delta(t)$. In addition, $\delta(t)=\delta_{SW}(t)/I_s$, where $I_s$ is a vehicle steering ratio and is a fixed value.

A longitudinal driving speed $v_x$(m/s), a vertical force $F_{zi}$(N) of a wheel, a side slip angle $\alpha_i$(deg) of a wheel, and an actual slip ratio $\lambda_i$(-) of a wheel that are estimated based on some or all of the foregoing parameters may be denoted as $v_x(t)$, $F_{zi}(t)$, $\alpha_1(t)$, and $\lambda_i(t)$ respectively.

Calculation methods for the foregoing parameters are known in the prior art and comparatively complex, and therefore are not described in detail in the embodiments of this application.

An embodiment of this application provides a vehicle stability control method. The method is applicable to the front axis and rear axis distributed driven vehicle shown in FIG. 6. The method is performed by a vehicle stability control device. The vehicle stability control device may be a whole vehicle controller, or may be a separate electronic device independent of a whole vehicle controller, or may be any in-vehicle device to which a vehicle stability control function is coupled. In the following embodiment, the vehicle stability control device may be referred to as an electronic device for short. In addition, in this embodiment of this application, any one of the following driving manners may be used for the vehicle: front-wheel driving, rear-wheel driving, four-wheel driving with optimal power, and four-wheel driving with an optimal effect. This is not limited in this application.

Figure 7:
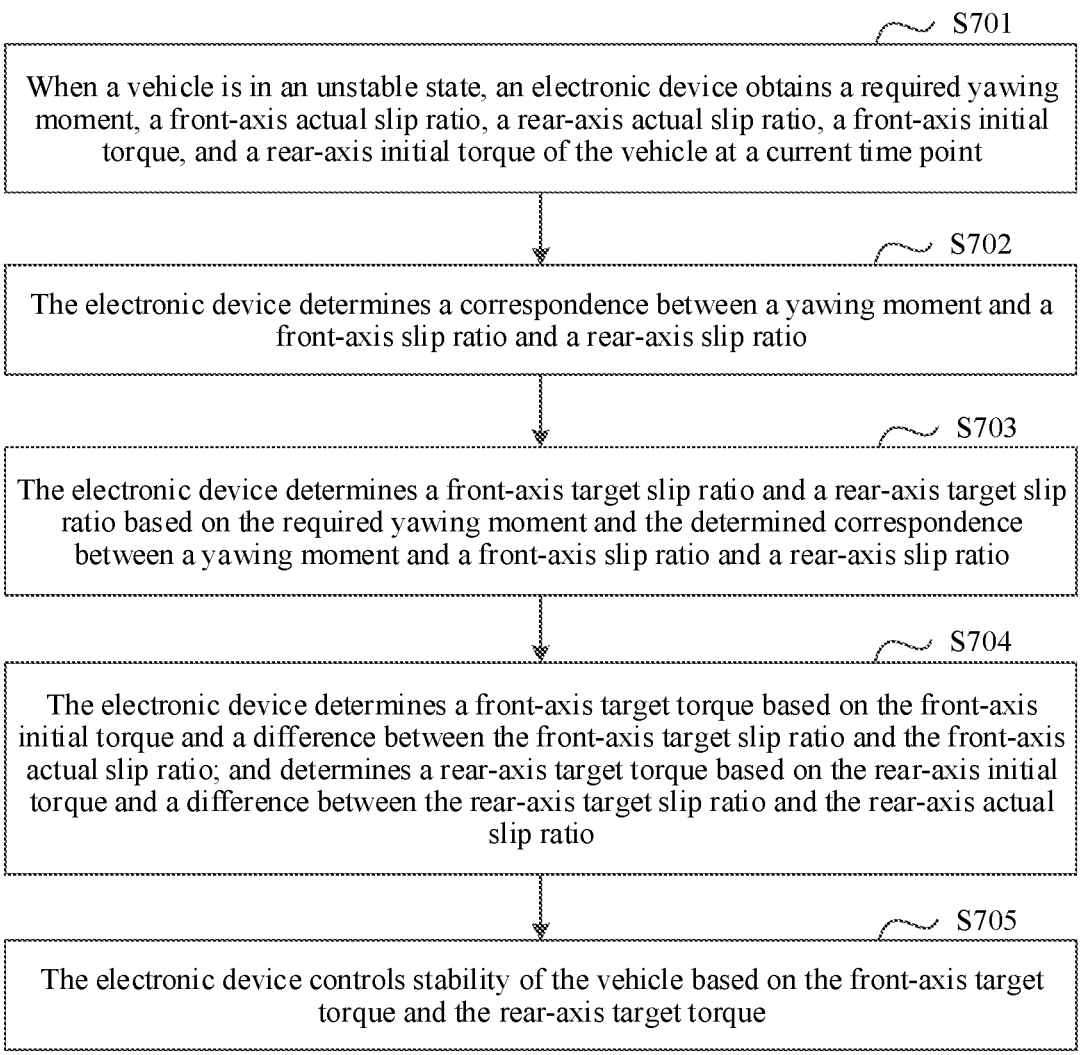
FIG. 7 is a flowchart of a vehicle stability control method according to an embodiment of this application.

Referring to FIG. 7, the method specifically includes the following steps.

S701. When the vehicle is in an unstable state, the electronic device obtains a required yawing moment, a front-axis actual slip ratio, a rear-axis actual slip ratio, a front-axis initial torque, and a rear-axis initial torque of the vehicle at a current time point.

In this embodiment of this application, when the vehicle is driving, the electronic device may further determine a status of the vehicle by using a plurality of methods, including but not limited to the following methods:

Method 1: The electronic device may obtain driving parameters of the vehicle, for example, a longitudinal driving speed, a lateral driving speed, a side slip angle of a center of mass of the vehicle, a longitudinal acceleration, and a lateral acceleration, and analyze the foregoing parameters to determine the status of the vehicle.

Method 2: An actual yawing angular velocity of the vehicle can represent an actual driving trajectory of the vehicle when a working condition of the vehicle remains unchanged. A target yawing angular velocity of the vehicle can represent a trajectory expected by a driver. It is learned that, usually, if an actual driving trajectory of the vehicle severely deviates from a trajectory expected by the driver, the vehicle is in an unstable state; otherwise, the vehicle is in a stable state. Therefore, in this embodiment of this application, the status of the vehicle may be determined based on an angular velocity error between the actual yawing angular velocity and the target yawing angular velocity of the vehicle. Specifically, the following steps may be included:

A1. The electronic device obtains a longitudinal driving speed, a wheel steering angle, and an actual yawing angular velocity of the vehicle at the current time point.

In step A1, the electronic device may collect a longitudinal acceleration $a_x(t)$, a lateral acceleration $a_y(t)$, a wheel speed $\omega_r(t)$, and the actual yawing angular velocity $\gamma(t)$ of the vehicle at the current time point by using an in-vehicle sensor. When the vehicle is manually driven, the electronic device may further obtain a steering wheel turning angle $\delta_{SW}(t)$ from a current steering wheel, and then obtain a wheel steering angle $\delta(t)$ based on $\delta_{SW}(t)/I_s$, where $I_s$ is a vehicle steering ratio and is a fixed value. When the vehicle is automatically driven, the electronic device may obtain a wheel steering angle $\delta(t)$ from an ADAS.

The electronic device may calculate the longitudinal driving speed $v_x(t)$ of the vehicle at the current time point by using a conventional longitudinal driving speed estimation method and based on the longitudinal acceleration $a_x(t)$, the lateral acceleration $a_y(t)$, the wheel speed $\omega_r(t)$, and the actual yawing angular velocity $\gamma(t)$.

A2. The electronic device determines a target yawing angular velocity based on the longitudinal driving speed, the wheel steering angle, and a stored steering characteristic factor.

The target yawing angular velocity meets the following formula:

$$\gamma_d(t) = \frac{v_x(t)\delta(t)}{(l_f + l_r)(1 + Kv_x(t)^2)}$$

where $\gamma_d(t)$ is the target yawing angular velocity, $l_f$ is a distance from the center of mass of the vehicle to a front axis, $l_r$ is a distance from the center of mass of the vehicle to a rear axis, $K$ is the steering characteristic factor, $t$ is the current time point, $K$ is obtained by constructing a two-degree-of-freedom vehicle model for the vehicle, it can be learned from the foregoing descriptions of the two-degree-of-freedom vehicle model that $$K = \frac{m}{(l_f + l_r)^2}\left(\frac{l_f}{k_r} - \frac{l_r}{k_f}\right),$$

m is a whole vehicle mass of the vehicle, and $k_f, k_r$ are equivalent cornering stiffnesses of a front wheel and a rear wheel respectively and are determined based on a feature of the wheels of the vehicle.

During specific implementation, for a purpose of safety, the electronic device may further perform saturation processing on the target yawing angular velocity.

A3. The electronic device calculates an angular velocity error between the actual yawing angular velocity and the target yawing angular velocity. Optionally, the angular velocity error $e_\gamma(t)$ meets the following formula:

$$e_\gamma(t) = \begin{cases} |\gamma(t)| - |\gamma_d(t)| & \gamma(t) * \gamma_d(t) > 0 \\ |\gamma(t) - \gamma_d(t)| & \gamma(t) * \gamma_d(t) < 0 \end{cases}$$

When the vehicle is driving, the in-vehicle sensor is subject to external interference, and collected data has an error. In addition, the target yawing angular velocity calculated by using the two-degree-of-freedom vehicle model also has an error. Although each error is comparatively small and can be ignored, when errors accumulate, a final determining result of the electronic device is affected. Therefore, a specific threshold needs to be set, to determine the status of the vehicle.

A4. When determining that the angular velocity error does not fall within a threshold interval formed by a first threshold and a second threshold, the electronic device determines that the vehicle is in an unstable state. The first threshold is a positive number, and the second threshold is a negative number.

In step A4, the electronic device may determine the status of the vehicle by using a determining method shown in the following formula:

$$e_\gamma(t) \in \begin{cases} (thd1, \infty) & \text{Unstable} \\ [thd2, thd1] & \text{Stable} \\ (-\infty, thd2) & \text{Unstable} \end{cases}$$

where thd1 is the first threshold, thd1 is a positive number, thd2 is the second threshold, and thd2 is a negative number.

It should be noted that values of thd1 and thd2 are not limited in this application, and the values of thd1 and thd2 may be specifically set based on an actual scenario and vehicle.

In a specific implementation, when performing step S701, the electronic device may obtain the front-axis actual slip ratio $\lambda_f(t)$ and the rear-axis actual slip ratio $\lambda_r(t)$ of the vehicle at the current time point by using the following steps:

First, the electronic device obtains the longitudinal acceleration $a_x(t)$, the lateral acceleration $a_y(t)$, the wheel speed $\omega_r(t)$, the actual yawing angular velocity $\gamma(t)$, and the wheel steering angle $\delta(t)$ of the vehicle at the current time point. For a specific process, refer to step A1.

Then the electronic device first calculates the longitudinal driving speed $v_x(t)$ based on the foregoing parameters, and then calculates actual slip ratios $\lambda_i(t)$ of four wheels based on the longitudinal driving speed $v_x(t)$ and the wheel speed $\omega_r(t)$ according to a conventional wheel slip ratio calculation method (as shown in the formula (10)), where i=1, 2, 3, 4 indicates a left front wheel, a right front wheel, a left rear wheel, and a right rear wheel respectively.

Finally, the electronic device calculates the front-axis actual slip ratio $\lambda_f(t)=\lambda_1(t)+\lambda_2(t)$, and calculates the rear-axis actual slip ratio $\lambda_r(t)=\lambda_3+\lambda_4(t)$.

In a specific implementation, in a manual driving scenario, the electronic device may calculate the front-axis initial torque $T_{f0}$ and the rear-axis initial torque $T_{r0}$ according to an optimal-power or optimal-energy method and based on opening degrees of an accelerator pedal and a brake pedal in a driver input apparatus, and a gear position output by a manual gear rocker and/or an automatic gear controller.

In a specific implementation, in an automatic driving scenario, the electronic device may calculate the front-axis initial torque $T_{f0}$ and the rear-axis initial torque $T_{r0}$ according to a braking or driving requirement output by the ADAS.

In a specific implementation, when performing step S701, the electronic device may obtain the required yawing moment M(t) of the vehicle by using the following steps:

The electronic device obtains an angular velocity error between the actual yawing angular velocity and the target yawing angular velocity. Optionally, when the electronic device determines the status of the vehicle by using steps A1 to A4, the electronic device may directly use the angular velocity error calculated in step A3.

Then the electronic device determines the required yawing moment based on the obtained angular velocity error.

In an example, when the angular velocity error is greater than the first threshold, the required yawing moment meets the following formula:

$$M(t) = -\text{sign}(\delta(t)) * \left( K_{Po}e_\gamma(t) + K_{Io}\int_{t_0}^{t} e_\gamma(t) + K_{Do}\frac{de_\gamma(t)}{dt} \right)$$

In another example, when the angular velocity error is less than the second threshold, the required yawing moment meets the following formula:

$$M(t) = \text{sign}(\delta(t)) * \left( K_{Pu}e_\gamma(t) + K_u\int_{t_0}^{t} e_\gamma(t) + K_{Du}\frac{de_\gamma(t)}{dt} \right)$$

where M(t) is the required yawing moment, sign($\delta$(t)) is a sign function, $\delta$(t) is the wheel steering angle, $e_\gamma$(t) is a difference between the actual yawing angular velocity and the target yawing angular velocity, $K_{Po}$ is a proportional module gain coefficient of the vehicle in case of oversteering, $K_{Io}$ is an integral module gain coefficient of the vehicle in case of oversteering, $K_{Do}$ is a differential module gain coefficient of the vehicle in case of oversteering, $t_0$ is a time point at which the vehicle is in an unstable state, t is the current time point, $K_{Pu}$ is a proportional module gain coefficient of the vehicle in case of understeering, $K_{Iu}$ is an integral module gain coefficient of the vehicle in case of understeering, and $K_{Du}$ is a differential module gain coefficient of the vehicle in case of understeering.

S702. The electronic device determines a correspondence between a yawing moment and a front-axis slip ratio and a rear-axis slip ratio.

In an implementation, the correspondence between the yawing moment and the front-axis slip ratio and the rear-axis slip ratio is stored in the electronic device.

In another implementation, the correspondence between the yawing moment and the front-axis slip ratio and the rear-axis slip ratio is determined by the electronic device based on a current driving status of the vehicle.

Based on the analysis on the two-degree-of-freedom vehicle model in the item (6), it may be determined that there is a correspondence between the yawing moment and a vehicle steering angle, a front-axis (wheel) lateral force, and a rear-axis (wheel) lateral force, as shown in the formula (7).

In addition, based on the linear analysis on the relationship between a lateral force and a yawing angular velocity in the item (7), a correspondence between a front-axis lateral force and a front-axis slip ratio, a front-axis side slip angle, and a front-axis vertical force, and a correspondence between a rear-axis lateral force and a rear-axis slip ratio, a rear-axis side slip angle, and a rear-axis vertical force may be further determined, as shown in the formula (12) and the formula (13) respectively.

In this application, when performing S702, the electronic device may substitute the formula (12) and the formula (13) into the formula (7), to obtain a target correspondence, that is, a correspondence between a yawing moment and a front-axis slip ratio, a rear-axis slip ratio, a vehicle steering angle, a front-axis side slip angle, a rear-axis side slip angle, a front-axis vertical force, and a rear-axis vertical force, as shown in the following formula:

$$M = \cos\delta(C_{1f}|\lambda_{fd}| + C_{0f})\alpha_f F_{zf}l_f - (C_{1r}|\lambda_{rd}| + C_{0r})\alpha_r F_{zr}l_r \quad \text{Formula (14)}$$

where M is the yawing moment, $\delta$ is a wheel steering angle, $C_{1f}$ and $C_{0f}$ are linearization coefficients of a front-axis equivalent wheel model, $C_{1r}$ and $C_{0r}$ are linearization coefficients of a rear-axis equivalent wheel, $\lambda_{fd}$ is a front-axis equivalent slip ratio, $\lambda_{rd}$ is a rear-axis equivalent slip ratio, $\alpha_f$ is a front-axis side slip angle, $\alpha_r$ is a rear-axis side slip angle, $F_{zf}$ is a front-axis vertical force, $F_{zr}$ is a rear-axis vertical force, $l_f$ is the distance from the center of mass of the vehicle to the front axis, and $l_r$ is the distance from the center of mass of the vehicle to the rear axis.

In addition, the electronic device may determine values of parameters other than M, $\lambda_{fd}$, and $\lambda_{rd}$ in the formula (14) at the current time point. For example, $\delta$ is a wheel steering angle $\delta$(t) at the current time point that is obtained by the electronic device, $\alpha_f$ is a front-axis side slip angle $$\alpha_f(t) = \frac{\alpha_1(t) + \alpha_2(t)}{2}$$

at the current time point that is calculated by the electronic device, $a_r$ is a rear-axis side slip angle $$\alpha_r(t) = \frac{\alpha_3(t) + \alpha_4(t)}{2}$$

at the current time point that is calculated by the electronic device, $F_{zf}$ is a front-axis vertical force $F_{zf}(t)=F_{z1}(t)+F_{z2}(t)$ at the current time point that is calculated by the electronic device, $F_{zr}$ is a rear-axis vertical force $F_{zr}(t)=F_{z3}(t)+F_{z4}(t)$ at the current time point that is calculated by the electronic device, $\alpha_i(t)$ is a side slip angle of each wheel at the current time point, $F_{zi}(t)$ is a vertical force of each wheel at the current time point, and i=1, 2, 3, 4 indicates a left front wheel, a right front wheel, a left rear wheel, and a right rear wheel respectively.

It should be noted that $\alpha_1(t)$ is determined by the electronic device based on a side slip angle of a center of mass according to a prior-art calculation method, and the side slip angle of the center of mass is estimated by the electronic device based on the parameters such as the longitudinal acceleration $\alpha_x(t)$, the lateral acceleration $\alpha_y(t)$, the wheel speed $\omega_i(t)$, the actual yawing angular velocity $\gamma(t)$, and the wheel steering angle $\delta$(t) of the vehicle at the current time point. $F_{zi}(t)$ is also estimated by the electronic device according to a prior-art calculation method, according to a braking or driving requirement of the vehicle, and based on the foregoing parameters, mass of the vehicle, $l_f$, $l_r$, and the like.

To sum up, the electronic device may obtain the values of the parameters other than M, $\lambda_{fd}$, and $\lambda_{rd}$ in the formula (14), and substitute the values into the formula (14), and the electronic device may establish the correspondence between a yawing moment and a front-axis slip ratio and a rear-axis slip ratio.

S703. The electronic device determines a front-axis target slip ratio and a rear-axis target slip ratio based on the required yawing moment and the determined correspondence between a yawing moment and a front-axis slip ratio and a rear-axis slip ratio.

In a specific implementation, the electronic device may determine the front-axis target slip ratio and the rear-axis target slip ratio by using the following steps:

B1. The electronic device determines a plurality of slip ratio combinations based on the required yawing moment and the correspondence between the yawing moment and the front-axis slip ratio and the rear-axis slip ratio. Each slip ratio combination includes one front-axis slip ratio and one rear-axis slip ratio.

In step B1, the electronic device may substitute the required yawing moment M(t) obtained in S701 into the formula (14), to obtain a constraint equation of a front-axis slip ratio and a rear-axis slip ratio. Because both a front-axis slip ratio and a rear-axis slip ratio in the constraint equation are absolute values, a plurality of slip ratio combinations may be obtained by solving the constraint equation.

B2. The electronic device selects, from the plurality of slip ratio combinations, at least one slip ratio combination in which a front-axis slip ratio and a rear-axis slip ratio are less than 0.

In this embodiment of this application, the vehicle may be currently in a driving mode or a braking mode. However, because the vehicle is unstable at the current time point, to ensure driving safety, braking usually needs to be performed on the vehicle to quickly ensure stability of the vehicle. In other words, because the vehicle is currently in the braking mode, both a front-axis slip ratio and a rear-axis slip ratio of the vehicle are less than 0.

B3. The electronic device selects, from the at least one slip ratio combination, a target slip ratio combination in which a sum of an absolute value of the front-axis slip ratio and an absolute value of the rear-axis slip ratio is smallest.

It is learned that, in the vehicle control field, a smaller absolute value of a slip ratio of a vehicle indicates a better braking effect and safer driving of the vehicle. Therefore, to ensure driving safety of the vehicle, the electronic device may select, from the at least one slip ratio combination, the target slip ratio combination in which the sum of the absolute value of the front-axis slip ratio and the absolute value of the rear-axis slip ratio is smallest.

B4. The electronic device determines the front-axis slip ratio in the target slip ratio combination as the front-axis target slip ratio, and determines the rear-axis slip ratio in the target slip ratio combination as the rear-axis target slip ratio.

By using the foregoing steps, the electronic device may quickly and accurately obtain the front-axis target slip ratio $\lambda_{fd}(t)$ and the rear-axis target slip ratio $\lambda_{rd}(t)$ that meet a current driving status, while ensuring driving safety of the vehicle.

S704. The electronic device determines a front-axis target torque based on the front-axis initial torque and a difference between the front-axis target slip ratio and the front-axis actual slip ratio; and determines a rear-axis target torque based on the rear-axis initial torque and a difference between the rear-axis target slip ratio and the rear-axis actual slip ratio.

In a specific implementation, the front-axis target torque meets the following formula:

$$T_f(t) = T_{f0} + K_P e_{\lambda f}(t) + K_I \int_{t_0}^{t} e_{\lambda f}(t) + K_D \frac{de_{\lambda f}(t)}{dt};$$

and the rear-axis target torque meets the following formula:

$$T_r(t) = T_{r0} + K_P e_{\lambda r}(t) + K_I \int_{t_0}^{t} e_{\lambda r}(t) + K_D \frac{de_{\lambda r}(t)}{dt}$$

where $T_f(t)$ is the front-axis target torque, $T_{f0}$ is the front-axis initial torque, $e_{\lambda f}(t)$ is the difference between the front-axis target slip ratio and the front-axis actual slip ratio, that is, $e_{\lambda f}(t)=\lambda_{fd}(t)-\lambda_f(t)$, $T_r(t)$ is the rear-axis target torque, $T_{r0}$ is the rear-axis initial torque, $e_{\lambda r}(t)$ is the difference between the rear-axis target slip ratio and the rear-axis actual slip ratio, that is, $e_{\lambda r}(t)=\lambda_{rd}-\lambda_r$ (t), $K_P$ is a proportional module gain coefficient, $K_I$ is an integral module gain coefficient, $K_D$ is a differential module gain coefficient, $t_0$ is a time point at which the vehicle is in an unstable state, and t is the current time point.

S705. The electronic device controls stability of the vehicle based on the front-axis target torque and the rear-axis target torque.

In a specific implementation, the electronic device may send the front-axis target torque $T_f(t)$ and the rear-axis target torque $T_r(t)$ to a torque execution unit in the vehicle. In this way, the torque execution unit may control a front-axis motor based on the front-axis target torque $T_f(t)$, and control a rear-axis motor based on the rear-axis target torque $T_r(t)$, so that the front-axis motor and the rear-axis motor exert corresponding target torques on the front axis and the rear axis respectively, to control stability of the vehicle and therefore ensure driving stability and safety of the vehicle.

In the foregoing implementation, finally, the front-axis motor and the rear-axis motor perform final stability control on the vehicle, and a control response of the motors is faster. Therefore, a yawing angular velocity of the vehicle converges at a faster speed, so that a time in which the vehicle enters a stable state from an unstable state is shorter, and safety of the vehicle can be further ensured.

In another implementation, when the vehicle is in an unstable state, the electronic device continuously performs the foregoing steps to determine a front-axis target torque and a rear-axis target torque in real time by monitoring a front-axis slip ratio and a rear-axis slip ratio of the vehicle, to continuously control stability of the vehicle.

This embodiment of this application provides the vehicle stability control method. In this method, when determining that the vehicle is unstable, the electronic device may obtain the front-axis actual slip ratio and the rear-axis actual slip ratio, and then quickly and accurately obtain the front-axis target slip ratio and the rear-axis target slip ratio that meet the current driving status. Further, the electronic device may determine, based on the difference between the front-axis target slip ratio and the front-axis actual slip ratio and the difference between the rear-axis target slip ratio and the rear-axis actual slip ratio, the front-axis target torque and the rear-axis target torque that can ensure stability of the vehicle. Further, the electronic device may control stability of the vehicle.

First, in this method, a yawing movement of the vehicle is considered, and an additional yawing moment for maintaining lateral stability of the vehicle is provided by compensating for front-axis and rear-axis slip ratios, to control lateral stability of the vehicle and therefore improve stability of the vehicle during driving. In addition, because the front-axis target slip ratio and the rear-axis target slip ratio are obtained based on the required yawing moment of the vehicle at the current time point, a front-axis target slip ratio and a rear-axis target slip ratio that are calculated in real time better meet a driving status of the vehicle at the current time point. That is, regardless of a driving manner used for the vehicle during stability control, vehicle stability can be quickly and accurately ensured by using this method.

Moreover, in this method, the correspondence between a yawing moment and a front-axis slip ratio and a rear-axis slip ratio is established by using the two-degree-of-freedom vehicle model and a locally linear wheel model, so that the electronic device can obtain, accurately and in real time, a front-axis target slip ratio and a rear-axis target slip ratio that better meet a driving status of the vehicle at the current time point, and therefore can control the vehicle in real time.

In addition, in this method, stability of the vehicle in various driving manners can be improved only through control by application software, without increasing hardware costs of the front axis and rear axis distributed driven vehicle. In addition, in this method, final stability control is performed by the motors. Because the motors have a very fast response speed, compared with a conventional hydraulic braking manner, this method can make a vehicle stability control process smoother, thereby improving use experience of the driver.

It should be further noted that the vehicle stability control method provided in this embodiment of this application and a conventional ESP may serve as redundancies and backups of each other. That is, two stability control mechanisms may be used for a vehicle to control stability of the vehicle, thereby further improving stability of the vehicle.

Figure 8:
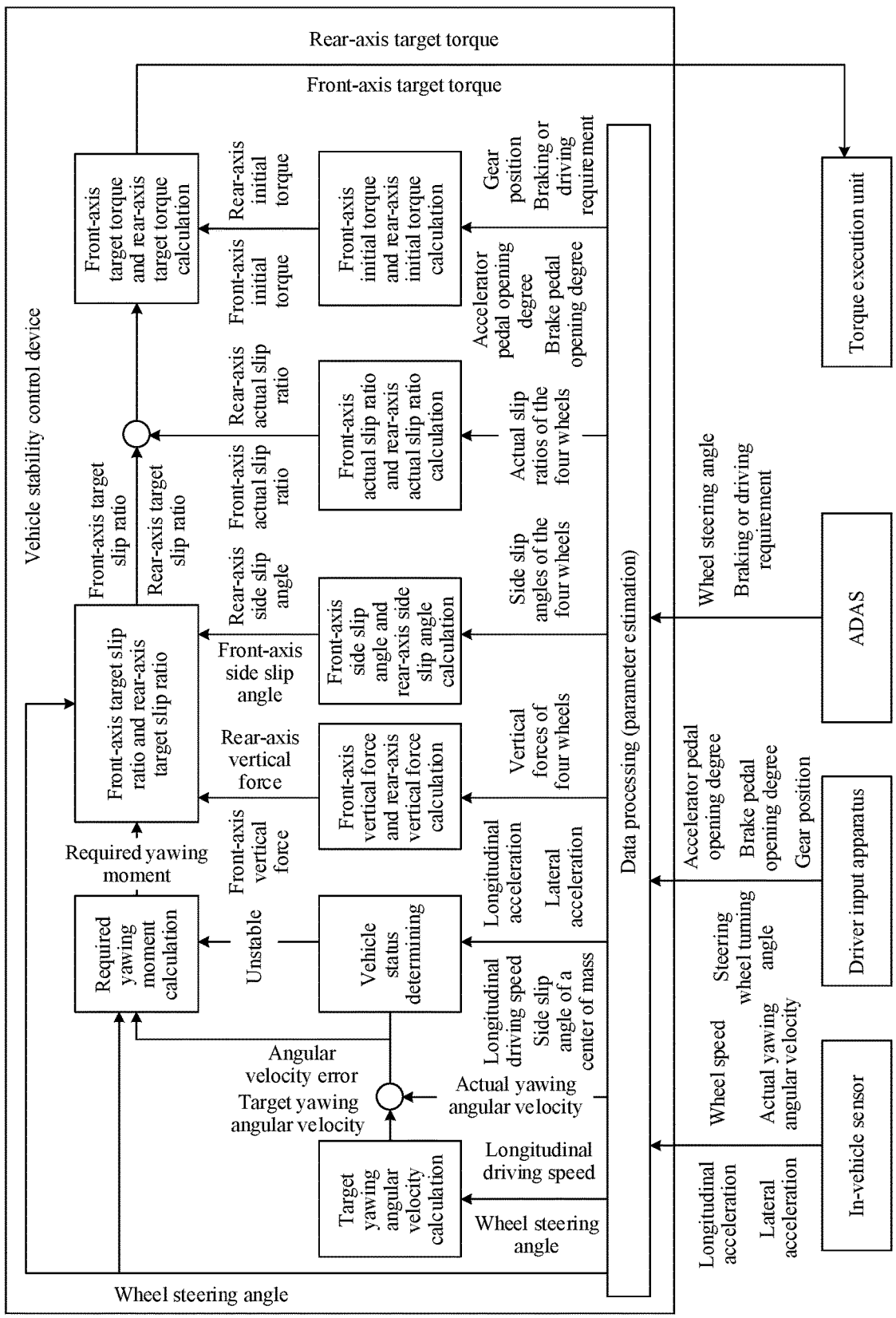
FIG. 8 is a schematic structural diagram of a vehicle stability control device according to an embodiment of this application.

Based on the foregoing embodiments, an embodiment of this application further provides a vehicle stability control device. The device is applicable to the front axis and rear axis distributed driven vehicle shown in FIG. 6, and is configured to implement the foregoing vehicle stability control method. The device may be a whole vehicle controller, or may be a separate electronic device independent of a whole vehicle controller, or may be any in-vehicle device to which a vehicle stability control function is coupled. As shown in FIG. 8, based on logical function division, the device includes the following 10 modules: signal processing (parameter estimation), target yawing angular velocity calculation, vehicle status determining, required yawing moment calculation, front-axis vertical force and rear-axis vertical force calculation, front-axis side slip angle and rear-axis side slip angle calculation, front-axis target slip ratio and rear-axis target slip ratio calculation, front-axis actual slip ratio and rear-axis actual slip ratio calculation, front-axis initial torque and rear-axis initial torque calculation, and front-axis target torque and rear-axis target torque calculation.

The device is connected to an in-vehicle sensor, a driver input apparatus, an ADAS, and a torque execution unit by using a bus. The device may obtain a longitudinal acceleration, a lateral acceleration, a wheel speed, and an actual yawing angular velocity of the vehicle at a current time point from the in-vehicle transmitter. When the vehicle is in a manual driving scenario, the device may obtain a steering wheel turning angle, an accelerator pedal opening degree, a brake pedal opening degree, and a gear position from the driver input apparatus. In an automatic driving scenario, the device may obtain a wheel steering angle and a braking or driving requirement from the ADAS.

After performing the vehicle stability control method to obtain a front-axis target torque and a rear-axis target torque, the device may send the front-axis target torque and the rear-axis target torque to the torque execution unit, so that the torque execution unit controls a front-axis motor and a rear-axis motor, to exert a braking or driving torque on a front axis and a rear axis, and finally control maneuverability and stability of the vehicle.

The following describes functions of modules in a process in which the device implements the foregoing vehicle stability control method.

The data processing module is configured to receive original data sent by the in-vehicle sensor, the driver input apparatus, and the ADAS, and calculate or estimate other related parameters based on the received original data, as shown in FIG. 8.

For example, the data processing module may calculate a longitudinal driving speed of the vehicle at the current time point by using a conventional longitudinal driving speed estimation method and based on the longitudinal acceleration, the lateral acceleration, the wheel speed, and the actual yawing angular velocity.

For another example, the data processing module calculates a wheel steering angle based on the steering wheel turning angle.

For still another example, the data processing module calculates a side slip angle of a center of mass of a wheel based on the longitudinal acceleration, the lateral acceleration, the wheel speed, the actual yawing angular velocity, the wheel steering angle, and the like, and estimates a side slip angle of each wheel based on the side slip angle of the center of mass.

For still another example, the data processing module estimates a vertical force of each wheel according to a braking or driving requirement of the vehicle and based on the longitudinal acceleration, the lateral acceleration, the wheel speed, the actual yawing angular velocity, the wheel steering angle, a mass of the vehicle, $l_f$, $l_r$, and the like.

For still another example, the data processing module calculates an actual slip ratio of each wheel based on the longitudinal driving speed and the wheel speed.

The target yawing angular velocity calculation module is configured to calculate a target yawing angular velocity based on the wheel steering angle and the longitudinal driving speed. The target yawing angular velocity meets the following formula:

$$\gamma_d(t) = \frac{v_x(t)\delta(t)}{(l_f + l_r)(1 + Kv_x(t)^2)}$$

where $\gamma_d(t)$ is the target yawing angular velocity, $v_x(t)$ is the longitudinal driving speed, $\delta(t)$ is the wheel steering angle, $l_f$ is a distance from the center of mass of the vehicle to a front axis, $l_r$ is a distance from the center of mass of the vehicle to a rear axis, K is a steering characteristic factor, and t is the current time point.

The vehicle status determining module is configured to determine a status of the vehicle. Optionally, the vehicle status determining module may be implemented by using a plurality of methods.

For example, the vehicle status determining module may perform analysis based on the longitudinal driving speed, a lateral driving speed, the side slip angle of the center of mass of the vehicle, the longitudinal acceleration, the lateral acceleration, and the like, to determine the status of the vehicle.

For another example, the vehicle status determining module may determine the status of the vehicle based on an angular velocity error between the actual yawing angular velocity and the target yawing angular velocity. The angular velocity error meets the following formula:

$$e_\gamma(t) = \begin{cases} |\gamma(t)| - |\gamma_d(t)| & \gamma(t)\gamma_d(t) > 0 \\ |\gamma(t) - \gamma_d(t)| & \gamma(t)\gamma_d(t) < 0 \end{cases}$$

where $e_\gamma(t)$ is the angular velocity error, $\gamma(t)$ is the actual yawing angular velocity, and $\gamma_d(t)$ is the target yawing angular velocity.

The status of the vehicle meets the following formula:

$$e_\gamma(t) \in \begin{cases} (thd1, \infty) & \text{Unstable} \\ [thd2, thd1] & \text{Stable} \\ (-\infty, thd2) & \text{Unstable} \end{cases}$$

where thd1 is a first threshold, thd1 is a positive number, thd2 is a second threshold, and thd2 is a negative number.

It should be noted that values of thd1 and thd2 are not limited in this application, and the values of thd1 and thd2 may be specifically set based on an actual scenario and vehicle.

The required yawing moment calculation module is configured to calculate a required yawing moment when the vehicle status determining module determines that the vehicle is unstable. The required yawing moment calculates the required yawing moment based on the angular velocity error and the wheel steering angle.

When the angular velocity error is greater than the first threshold, the required yawing moment meets the following formula:

$$M(t) = -\text{sign}(\delta(t)) * \left(K_{Po}e_\gamma(t) + K_{Io}\int_{t_0}^{t} e_\gamma(t) + K_{Do}\frac{de_\gamma(t)}{dt}\right)$$

When the angular velocity error is less than the second threshold, the required yawing moment meets the following formula:

$$M(t) = \text{sign}(\delta(t)) * \left(K_{Pu}e_\gamma(t) + K_{Iu}\int_{t_0}^{t} e_\gamma(t) + K_{Du}\frac{de_\gamma(t)}{dt}\right)$$

where $M(t)$ is the required yawing moment, $\text{sign}(\delta(t))$ is a sign function, $\delta(t)$ is the wheel steering angle, $e_\gamma(t)$ is a difference between the actual yawing angular velocity and the target yawing angular velocity, $K_{Po}$ is a proportional module gain coefficient of the vehicle in case of oversteering, $K_{Io}$ is an integral module gain coefficient of the vehicle in case of oversteering, $K_{Do}$ is a differential module gain coefficient of the vehicle in case of oversteering, $t_0$ is a time point at which the vehicle is in an unstable state, $t$ is the current time point, $K_{Pu}$ is a proportional module gain coefficient of the vehicle in case of understeering, $K_{Iu}$ is an integral module gain coefficient of the vehicle in case of understeering, and $K_{Du}$ is a differential module gain coefficient of the vehicle in case of understeering.

The front-axis vertical force and rear-axis vertical force calculation module is configured to calculate a front-axis vertical force and a rear-axis vertical force based on vertical forces of four wheels. The front-axis vertical force is as follows: $F_{zf}(t)=F_{z1}(t)+F_{z2}(t)$ The rear-axis vertical force is as follows: $F_{zr}(t)=F_{z3}(t)+F_{z4}(t)$. $F_{zi}(t)$ is a vertical force of each wheel at the current time point. i=1, 2, 3, 4 indicates a left front wheel, a right front wheel, a left rear wheel, and a right rear wheel respectively.

The front-axis side slip angle and rear-axis side slip angle calculation module is configured to calculate a front-axis side slip angle and a rear-axis side slip angle based on side slip angles of the four wheels. The front-axis side slip angle is as follows:

$$\alpha_f(t) = \frac{\alpha_1(t) + \alpha_2(t)}{2}.$$

The rear-axis side slip angle is as follows:

$$\alpha_r(t) = \frac{\alpha_3(t) + \alpha_4(t)}{2}.$$

$\alpha_i(t)$ is a side slip angle of each wheel at the current time point.

The front-axis target slip ratio and rear-axis target slip ratio calculation module is configured to calculate a front-axis target slip ratio and a rear-axis target slip ratio based on the required yawing moment, the wheel steering angle, the front-axis vertical force, the rear-axis vertical force, the front-axis side slip angle, the rear-axis side slip angle, and a stored target correspondence (as shown in FIG. 14).

In a specific implementation, the front-axis target slip ratio and rear-axis target slip ratio calculation module first substitutes the obtained wheel steering angle, front-axis vertical force, rear-axis vertical force, front-axis side slip angle, and rear-axis side slip angle into the following formula, to obtain a correspondence between a yawing moment and a front-axis slip ratio and a rear-axis slip ratio:

$$M = \cos\delta(C_{1f}|\lambda_{fd}| + C_{0f})\alpha_f F_{zf}l_f - (C_{1r}|\lambda_{rd}| + C_{0r})\alpha_r F_{zr}l_r \quad \text{Formula (14)}$$

where M is a yawing moment, $\delta$ is a wheel steering angle, $C_{1f}$ and $C_{0f}$ are linearization coefficients of a front-axis equivalent wheel model, $C_{1r}$ and $C_0$, are linearization coefficients of a rear-axis equivalent wheel, $\lambda_{fd}$ is a front-axis equivalent slip ratio, $\lambda_{rd}$ is a rear-axis equivalent slip ratio, $\alpha_f$ is a front-axis side slip angle, $\alpha_r$ is a rear-axis side slip angle, $F_{zf}$ is a front-axis vertical force, $F_{zr}$ is a rear-axis vertical force, $l_f$ is the distance from the center of mass of the vehicle to the front axis, and $l_r$ is the distance from the center of mass of the vehicle to the rear axis.

Then the front-axis target slip ratio and rear-axis target slip ratio calculation module calculates the front-axis target slip ratio and the rear-axis target slip ratio based on the required yawing moment and the correspondence between a yawing moment and a front-axis slip ratio and a rear-axis slip ratio.

The front-axis actual slip ratio and rear-axis actual slip ratio calculation module is configured to calculate a front-axis actual slip ratio and a rear-axis actual slip ratio based on actual slip ratios of the four wheels. The front-axis actual slip ratio is as follows: $\lambda_f(t)=\lambda_1(t)+\lambda_2(t)$. The rear-axis actual slip ratio is as follows: $\lambda_r(t)=\lambda_3(t)+\lambda_4(t)$. $\lambda_i(t)$ is an actual slip ratio of each wheel at the current time point.

The front-axis initial torque and rear-axis initial torque calculation module is configured to: in a manual driving scenario, the electronic device may calculate a front-axis initial torque $T_{f0}$ and a rear-axis initial torque $T_{r0}$ according to an optimal-power or optimal-energy method and based on opening degrees of an accelerator pedal and a brake pedal in the driver input apparatus, and a gear position output by a manual gear rocker and/or an automatic gear controller; and in an automatic driving scenario, the electronic device may calculate a front-axis initial torque $T_{f0}$ and a rear-axis initial torque $T_{r0}$ according to a braking or driving requirement output by the ADAS.

The front-axis target torque and rear-axis target torque calculation module is configured to: obtain a difference $e_{\lambda f}(t)$ between the front-axis target slip ratio and the front-axis actual slip ratio, and then obtain a front-axis target torque based on $e_{\lambda f}(t)$, the front-axis initial torque, and a formula $$T_f(t) = T_{f0} + K_P e_{\lambda f}(t) + K_I \int_{t_0}^{t} e_{\lambda f}(t) + K_D \frac{de_{\lambda f}(t)}{dt};$$

and obtain a difference $e_{\lambda r}(t)$ between the rear-axis target slip ratio and the rear-axis actual slip ratio, and then obtain a rear-axis torque based on $e_{\lambda r}(t)$, the rear-axis initial torque, and a formula $$T_r(t) = T_{r0} + K_P e_{\lambda r}(t) + K_I \int_{t_0}^{t} e_{\lambda r}(t) + K_D \frac{de_{\lambda r}(t)}{dt};$$

where $T_f(t)$ is the front-axis target torque, $T_{f0}$ is the front-axis initial torque, $e_{\lambda f}(t)$ is the difference between the front-axis target slip ratio and the front-axis actual slip ratio, that is, $e_{\lambda f}(t)=\lambda_{fd}(t)-\lambda_f(t)$, $T_r(t)$ is the rear-axis target torque, $T_{r0}$ is the rear-axis initial torque, $e_{\lambda r}(t)$ is the difference between the rear-axis target slip ratio and the rear-axis actual slip ratio, that is, $e_{\lambda r}(t)=\lambda_{rd}-\lambda_r(t)$, $K_P$ is a proportional module gain coefficient, $K_I$ is an integral module gain coefficient, $K_D$ is a differential module gain coefficient, $t_0$ is a time point at which the vehicle is in an unstable state, and t is the current time point.

Figure 9:
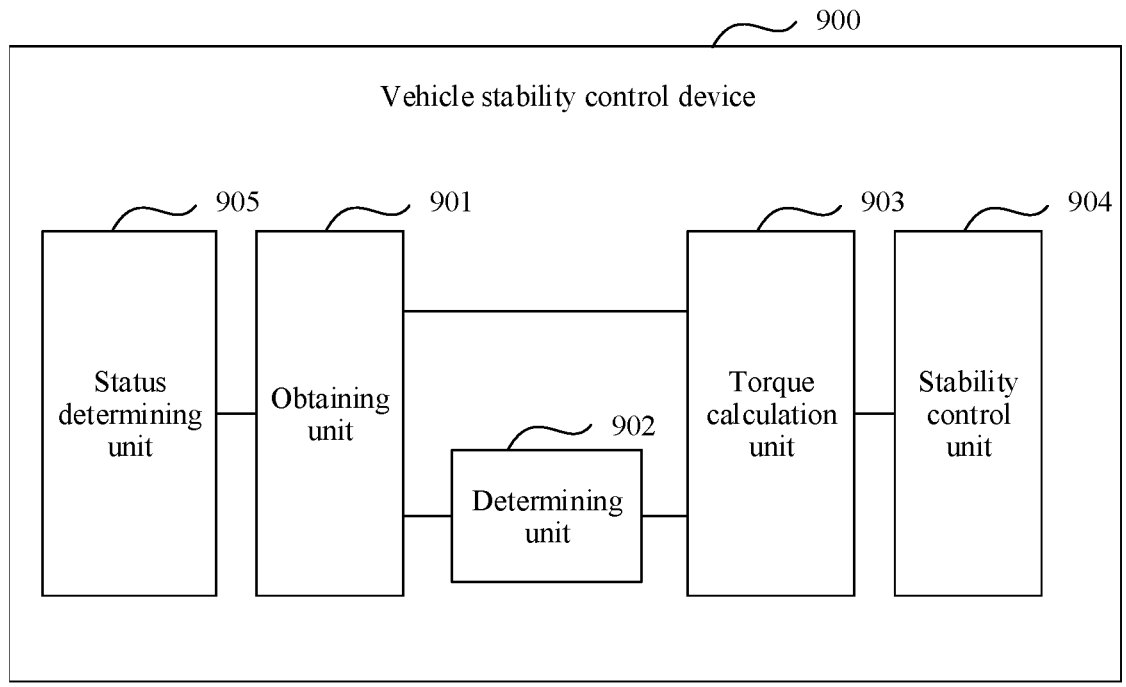
FIG. 9 is a schematic structural diagram of another vehicle stability control device according to an embodiment of this application.

Based on the foregoing embodiments, an embodiment of this application further provides a vehicle stability control device. The device is applicable to the front axis and rear axis distributed driven vehicle shown in FIG. 6, is configured to implement the foregoing vehicle stability control method, and has functions of the device shown in FIG. 8. Referring to FIG. 9, the device 900 includes an obtaining unit 901, a determining unit 902, a torque calculation unit 903, and a stability control unit 904. The following describes a function of each unit when the device 900 performs vehicle stability control.

The obtaining unit 901 is configured to: when the vehicle is in an unstable state, obtain a required yawing moment, a front-axis actual slip ratio, a rear-axis actual slip ratio, a front-axis initial torque, and a rear-axis initial torque of the vehicle at a current time point.

The determining unit 902 is configured to determine a correspondence between a yawing moment of the vehicle and a front-axis slip ratio and a rear-axis slip ratio of the vehicle, and determine a front-axis target slip ratio and a rear-axis target slip ratio based on the required yawing moment and the determined correspondence between the yawing moment and the front-axis slip ratio and the rear-axis slip ratio.

The torque calculation unit 903 is configured to determine a front-axis target torque based on the front-axis initial torque and a difference between the front-axis target slip ratio and the front-axis actual slip ratio, and determine a rear-axis target torque based on the rear-axis initial torque and a difference between the rear-axis target slip ratio and the rear-axis actual slip ratio.

The stability control unit 904 is configured to control stability of the vehicle based on the front-axis target torque and the rear-axis target torque.

In an implementation, the device further includes a status determining unit 905, configured to determine, by using the following steps, that the vehicle is in an unstable state:

obtaining a longitudinal driving speed, a wheel steering angle, and an actual yawing angular velocity of the vehicle at the current time point;

determining a target yawing angular velocity based on the longitudinal driving speed, the wheel steering angle, and a stored steering characteristic factor, where the steering characteristic factor is a constant value used to represent a steering characteristic of the vehicle;

calculating an angular velocity error between the actual yawing angular velocity and the target yawing angular velocity; and if the angular velocity error does not fall within a preset threshold interval, determining that the vehicle is in an unstable state, where the preset threshold interval is an interval formed by the first threshold and the second threshold, the first threshold is a positive number, and the second threshold is a negative number.

For example, the target yawing angular velocity meets the following formula:

$$\gamma_d(t) = \frac{v_x(t)\delta(t)}{(l_f + l_r)(1 + Kv_x(t)^2)}$$

where $\gamma_d(t)$ is the target yawing angular velocity, $v_x(t)$ is the longitudinal driving speed, $\delta(t)$ is the wheel steering angle, $l_f$ is a distance from a center of mass of the vehicle to a front axis, $l_r$ is a distance from the center of mass of the vehicle to a rear axis, K is the steering characteristic factor, and t is the current time point.

In an implementation, the obtaining unit 901 may determine the required yawing moment based on the angular velocity error.

For example, when the angular velocity error is greater than the first threshold, the required yawing moment meets the following formula:

$$M(t) = -\text{sign}(\delta(t)) * \left( K_{Po} e_\gamma(t) + K_{Io} \int_{t_0}^{t} e_\gamma(t) + K_{Do} \frac{de_\gamma(t)}{dt} \right);$$

or when the angular velocity error is less than the second threshold, the required yawing moment meets the following formula:

$$M(t) = \text{sign}(\delta(t)) * \left( K_{Pu} e_\gamma(t) + K_{Iu} \int_{t_0}^{t} e_\gamma(t) + K_{Du} \frac{de_\gamma(t)}{dt} \right)$$

where M(t) is the required yawing moment, sign($\delta(t)$) is a sign function, $\delta(t)$ is the wheel steering angle, $e_\gamma(t)$ is a difference between the actual yawing angular velocity and the target yawing angular velocity, $K_{Po}$ is a proportional module gain coefficient of the vehicle in case of oversteering, $K_{Io}$ is an integral module gain coefficient of the vehicle in case of oversteering, $K_{Do}$ is a differential module gain coefficient of the vehicle in case of oversteering, $t_0$ is a time point at which the vehicle is in an unstable state, t is the current time point, $K_{Pu}$ is a proportional module gain coefficient of the vehicle in case of understeering, $K_{Iu}$ is an integral module gain coefficient of the vehicle in case of understeering, and $K_{Du}$ is a differential module gain coefficient of the vehicle in case of understeering.

For example, the angular velocity error meets the following formula:

$$e_\gamma(t) = \begin{cases} |\gamma(t)| - |\gamma_d(t)| & \gamma(t)\gamma_d(t) > 0 \\ |\gamma(t) - \gamma_d(t)| & \gamma(t)\gamma_d(t) < 0 \end{cases}$$

where $e_\gamma(t)$ is the angular velocity error, $\gamma(t)$ is the actual yawing angular velocity, and $\gamma_d(t)$ is the target yawing angular velocity.

In an implementation, the determining unit 902 may determine the correspondence between the yawing moment and the front-axis slip ratio and the rear-axis slip ratio by using the following steps:

obtaining the wheel steering angle, a front-axis side slip angle, a rear-axis side slip angle, a front-axis vertical force, and a rear-axis vertical force of the vehicle at the current time point; and establishing the correspondence between the yawing moment and the front-axis slip ratio and the rear-axis slip ratio based on the wheel steering angle, the front-axis side slip angle, the rear-axis side slip angle, the front-axis vertical force, and the rear-axis vertical force.

For example, the correspondence between the yawing moment and the front-axis slip ratio and the rear-axis slip ratio meets the following formula:

$$M = \cos \delta(C_{1f}|\lambda_{fd}| + C_{0f})\alpha_f F_{zf} l_f - (C_{1r}|\lambda_{rd}| + C_{0r})\alpha_r F_{zr} l_r$$

where M is the yawing moment, $\delta$ is a wheel steering angle, $C_{1f}$ and $C_{0f}$ are linearization coefficients of a front-axis equivalent wheel model, $C_{1r}$ and $C_{0r}$ are linearization coefficients of a rear-axis equivalent wheel, $\lambda_{fd}$ is a front-axis slip ratio, $\lambda_{rd}$ is a rear-axis slip ratio, $\alpha_f$ is a front-axis side slip angle, $\alpha_r$ is a rear-axis side slip angle, $F_{zf}$ is a front-axis vertical force, $F_{zr}$ is a rear-axis vertical force, $l_f$ is the distance from the center of mass of the vehicle to the front axis, and $l_r$ is the distance from the center of mass of the vehicle to the rear axis.

In an implementation, the determining unit 902 may determine the front-axis target slip ratio and the rear-axis target slip ratio based on the required yawing moment and the determined correspondence between a yawing moment and a front-axis slip ratio and a rear-axis slip ratio by using the following steps:

determining a plurality of slip ratio combinations based on the required yawing moment and the correspondence between a yawing moment and a front-axis slip ratio and a rear-axis slip ratio, where each slip ratio combination includes one front-axis slip ratio and one rear-axis slip ratio;

selecting, from the plurality of slip ratio combinations, at least one slip ratio combination in which a front-axis slip ratio and a rear-axis slip ratio are less than 0;

selecting, from the at least one slip ratio combination, a target slip ratio combination in which a sum of an absolute value of a front-axis slip ratio and an absolute value of a rear-axis slip ratio is smallest; and determining the front-axis slip ratio in the target slip ratio combination as the front-axis target slip ratio, and determining the rear-axis slip ratio in the target slip ratio combination as the rear-axis target slip ratio.

For example, the front-axis target torque meets the following formula:

$$T_f(t) = T_{f0} + K_P e_{\lambda f}(t) + K_I \int_{t_0}^{t} e_{\lambda f}(t) + K_D \frac{d e_{\lambda f}(t)}{dt};$$

and the rear-axis target torque meets the following formula:

$$T_r(t) = T_{r0} + K_P e_{\lambda r}(t) + K_I \int_{t_0}^{t} e_{\lambda r}(t) + K_D \frac{d e_{\lambda r}(t)}{dt}$$

where $T_f(t)$ is the front-axis target torque, $T_{f0}$ is the front-axis initial torque, $e_{\lambda f}(t)$ is the difference between the front-axis target slip ratio and the front-axis actual slip ratio, $T_r(t)$ is the rear-axis target torque, $T_{r0}$ is the rear-axis initial torque, $e_{\lambda r}(t)$ is the difference between the rear-axis target slip ratio and the rear-axis actual slip ratio, $K_P$ is a proportional module gain coefficient, $K_I$ is an integral module gain coefficient, $K_D$ is a differential module gain coefficient, $t_0$ is a time point at which the vehicle is in an unstable state, and t is the current time point.

The foregoing embodiment provides the vehicle stability control device. When the vehicle is unstable, the device may obtain the front-axis actual slip ratio and the rear-axis actual slip ratio, and then quickly and accurately obtain the front-axis target slip ratio and the rear-axis target slip ratio that meet a current driving status. Further, the device may determine, based on the difference between the front-axis target slip ratio and the front-axis actual slip ratio and the difference between the rear-axis target slip ratio and the rear-axis actual slip ratio, the front-axis target torque and the rear-axis target torque that can ensure stability of the vehicle. Further, the device may control stability of the vehicle. In the device, a yawing movement of the vehicle is considered, and an additional yawing moment for maintaining lateral stability of the vehicle is provided by compensating for front-axis and rear-axis slip ratios, to control lateral stability of the vehicle and therefore improve stability of the vehicle during driving. In addition, because the front-axis target slip ratio and the rear-axis target slip ratio are obtained based on the required yawing moment of the vehicle at the current time point, a front-axis target slip ratio and a rear-axis target slip ratio that are calculated in real time better meet a driving status of the vehicle at the current time point. That is, regardless of a driving manner used for the vehicle during stability control, vehicle stability can be quickly and accurately ensured by using the device.

It should be noted that the module division in the embodiments of this application is an example, and is merely logical function division, and there may be other division manners in actual implementation. In addition, functional units in the embodiments of this application may be integrated into one processing unit, or each of the units may exist alone physically, or at least two units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 10:
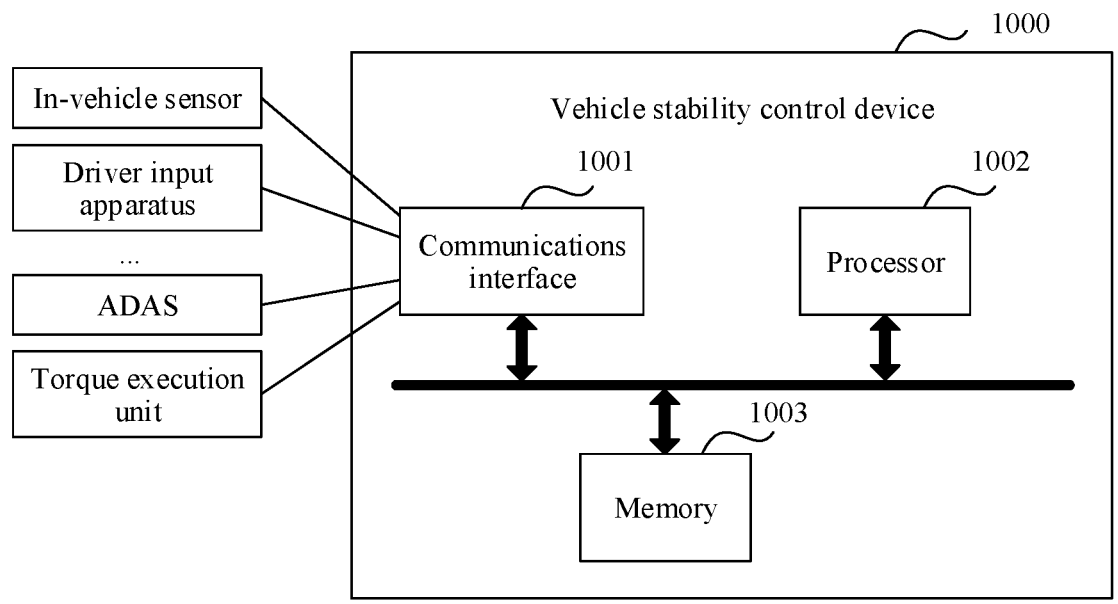
FIG. 10 is a schematic structural diagram of another vehicle stability control device according to an embodiment of this application.

Based on the foregoing embodiments, an embodiment of this application further provides a vehicle stability control device. The device is applicable to the front axis and rear axis distributed driven vehicle shown in FIG. 6, is configured to implement the foregoing vehicle stability control method, and has functions of the devices shown in FIG. 8 and FIG. 9. Referring to FIG. 10, the device 1000 includes a communications interface 1001, a processor 1002, and a memory 1003.

The communications interface 1001, the memory 1003, and the processor 1002 are connected to each other. Optionally, the communications interface 1001, the memory 1003, and the processor 1002 may be connected to each other by using a bus. The bus may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 10, but this does not mean that there is only one bus or only one type of bus.

The communications interface 1001 is configured to communicate with other components in the vehicle. For example, the communications interface 1001 obtains various types of data from components such as an in-vehicle sensor, a driver input apparatus, and an ADAS. For another example, the communications interface 1001 sends a calculated front-axis target torque and rear-axis target torque to a torque execution unit, to finally control stability of the vehicle.

The processor 1002 is configured to implement the vehicle stability control method shown in FIG. 7. For details, refer to the descriptions in the foregoing embodiments. Details are not described herein again. Optionally, the processor 1002 may be a central processing unit (CPU) or another hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. When the processor 1002 implements the foregoing functions, the functions may be implemented by hardware, or certainly, may be implemented by hardware by executing corresponding software.

The memory 1003 is configured to store a program instruction, data, and the like. Specifically, the program instruction may include program code, and the program code includes a computer operation instruction. The memory 1003 may include a random access memory (RAM), or may be a non-volatile memory, for example, at least one magnetic disk memory. The processor 1002 executes a program stored in the memory 1003, and implements the foregoing functions by using the foregoing components, to finally implement the method provided in the foregoing embodiments.

Based on the foregoing embodiments, an embodiment of this application further provides a computer program. When the computer program runs on a computer, the computer is enabled to perform the method provided in the foregoing embodiments.

Based on the foregoing embodiments, an embodiment of this application further provides a computer storage medium. The computer storage medium stores a computer program. When the computer program is executed by a computer, the computer is enabled to perform the method provided in the foregoing embodiments.

Based on the foregoing embodiments, an embodiment of this application further provides a chip. The chip is configured to read a computer program stored in a memory, to implement the method provided in the foregoing embodiments.

Based on the foregoing embodiments, an embodiment of this application further provides a chip system. The chip system includes a processor, configured to support a computer apparatus in implementing functions related to a terminal device in the method provided in the foregoing embodiments. In a possible design, the chip system further includes a memory. The memory is configured to store a program and data that are necessary for the computer apparatus. The chip system may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A vehicle stability control method, applied to a vehicle stability control device, the method comprising:
   in response to a vehicle being in an unstable state, obtaining a required yawing moment, a front-axis actual slip ratio, a rear-axis actual slip ratio, a front-axis initial torque, and a rear-axis initial torque of the vehicle at a current time point;
   determining a correspondence between a yawing moment of the vehicle and a front-axis slip ratio and a rear-axis slip ratio of the vehicle;
   determining a front-axis target slip ratio and a rear-axis target slip ratio based on the required yawing moment and the determined correspondence between the yawing moment of the vehicle and the front-axis slip ratio and the rear-axis slip ratio of the vehicle;
   determining a front-axis target torque based on the front-axis initial torque and a difference between the front-axis target slip ratio and the front-axis actual slip ratio;
   determining a rear-axis target torque based on the rear-axis initial torque and a difference between the rear-axis target slip ratio and the rear-axis actual slip ratio; and
   controlling stability of the vehicle based on the front-axis target torque and the rear-axis target torque.

2. The method according to claim 1, further comprising:
   obtaining a longitudinal driving speed, a wheel steering angle, and an actual yawing angular velocity of the vehicle at the current time point;
   determining a target yawing angular velocity based on the longitudinal driving speed, the wheel steering angle, and a stored steering characteristic factor, wherein the steering characteristic factor is used to represent a constant of a steering characteristic of the vehicle;
   determining an angular velocity error between the actual yawing angular velocity and the target yawing angular velocity; and
   in response to the angular velocity error not falling within a preset threshold interval, determining that the vehicle is in an unstable state, wherein the preset threshold interval is an interval formed by the first threshold and the second threshold, the first threshold is a positive number, and the second threshold is a negative number.

3. The method according to claim 2, wherein the target yawing angular velocity meets the following:

$$\gamma_d(t) = \frac{v_x(t)\delta(t)}{(l_f + l_r)(1 + Kv_x(t)^2)}$$

wherein $\gamma_d(t)$ is the target yawing angular velocity, $v_x(t)$ is the longitudinal driving speed, $\delta(t)$ is the wheel steering angle, $l_f$ is a distance from a center of mass of the vehicle to a front axis, $l_r$ is a distance from the center of mass of the vehicle to a rear axis, K is the steering characteristic factor, and t is the current time point.

4. The method according to claim 2, wherein the obtaining the required yawing moment comprises:
   determining the required yawing moment based on the angular velocity error.

5. The method according to claim 4, wherein
   in response to the angular velocity error being greater than the first threshold, the required yawing moment meets the following:

$$M(t) = -\text{sign}(\delta(t)) * \left(K_{Po}e_\gamma(t) + K_o \int_{t_0}^{t} e_\gamma(t) + K_{Do}\frac{de_\gamma(t)}{dt}\right)$$

in response to the angular velocity error being less than the second threshold, the required yawing moment meets the following:

$$M(t) = \text{sign}(\delta(t)) * \left(K_{Pu}e_\gamma(t) + K_u \int_{t_0}^{t} e_\gamma(t) + K_{Du}\frac{de_\gamma(t)}{dt}\right)$$

wherein M(t) is the required yawing moment, sign($\delta$(t)) is a sign function, $\delta$(t) is the wheel steering angle, $e_\gamma$(t) is a difference between the actual yawing angular velocity and the target yawing angular velocity, $K_{Po}$ is a proportional module gain coefficient of the vehicle in case of oversteering; $K_{Io}$ is an integral module gain coefficient of the vehicle in case of oversteering, $K_{Do}$ is a differential module gain coefficient of the vehicle in case of oversteering; $t_0$ is a time point at which the vehicle is in an unstable state, t is the current time point; $K_{Pu}$ is a proportional module gain coefficient of the vehicle in case of understeering, $K_{Iu}$ is an integral module gain coefficient of the vehicle in case of understeering, and $K_{Du}$ is a differential module gain coefficient of the vehicle in case of understeering.

6. The method according to claim 2, wherein the angular velocity error meets the following:

$$e_\gamma(t) = \begin{cases} |\gamma(t)| - |\gamma_d(t)| & \gamma(t)\gamma_d(t) > 0 \\ |\gamma(t) - \gamma_d(t)| & \gamma(t)\gamma_d(t) < 0 \end{cases}$$

wherein $e_\gamma$(t) is the angular velocity error, $\gamma$(t) is the actual yawing angular velocity, and $\gamma_d$(t) is the target yawing angular velocity.

7. The method according to claim 1, wherein the determining the correspondence between the yawing moment of the vehicle and the front-axis slip ratio and the rear-axis slip ratio of the vehicle comprises:
   obtaining the wheel steering angle, a front-axis side slip angle, a rear-axis side slip angle, a front-axis vertical force, and a rear-axis vertical force of the vehicle at the current time point; and establishing the correspondence between the yawing moment and the front-axis slip ratio and the rear-axis slip ratio based on the wheel steering angle, the front-axis side slip angle, the rear-axis side slip angle, the front-axis vertical force, and the rear-axis vertical force.

8. The method according to claim 7, wherein the correspondence between the yawing moment and the front axis slip ratio and the rear-axis slip ratio meets the following:

$$M = \cos\delta(C_{1f}|\lambda_{fd}| + C_{0f})\alpha_f F_{zf} l_f - (C_{1r}|\lambda_{rd}| + C_{0r})\alpha_r F_{zr} l_r$$

wherein M is the yawing moment, $\delta$ is the wheel steering angle, $C_{1f}$ and $C_{0f}$ are linearization coefficients of a front-axis equivalent wheel model, $C_{1r}$ and $C_{0r}$ are linearization coefficients of a rear-axis equivalent wheel, $\lambda_{fd}$ is the front-axis slip ratio, $\lambda_{rd}$ is the rear-axis slip ratio, $\alpha_f$ is the front-axis side slip angle, $\alpha_r$ is the rear-axis side slip angle, $F_{zf}$ is the front-axis vertical force, $F_{zr}$ is the rear-axis vertical force, $l_f$ is the distance from the center of mass of the vehicle to the front axis, and $l_r$ is the distance from the center of mass of the vehicle to the rear axis.

9. The method according to claim 8, wherein the determining the front-axis target slip ratio and the rear-axis target slip ratio based on the required yawing moment and the determined correspondence between the yawing moment and the front-axis slip ratio and the rear-axis slip ratio comprises:
  determining a plurality of slip ratio combinations based on the required yawing moment and the correspondence between the yawing moment and the front-axis slip ratio and the rear-axis slip ratio, where each slip ratio combination includes one front-axis slip ratio and one rear-axis slip ratio;
  selecting, from the plurality of slip ratio combinations, at least one slip ratio combination in which the front-axis slip ratio and the rear-axis slip ratio are less than 0;
  selecting, from the at least one slip ratio combination, a target slip ratio combination in which a sum of an absolute value of the front-axis slip ratio and an absolute value of the rear-axis slip ratio is smallest; and
  determining the front-axis slip ratio in the target slip ratio combination as the front-axis target slip ratio, and determining the rear-axis slip ratio in the target slip ratio combination as the rear-axis target slip ratio.

10. The method according to claim 1, wherein the front-axis target torque meets the following:

$$T_f(t) = T_{f0} + K_P e_{\lambda f}(t) + K_I \int_{t_0}^{t} e_{\lambda f}(t) + K_D \frac{de_{\lambda f}(t)}{dt};$$

the rear-axis target torque meets the following $$T_r(t) = T_{r0} + K_P e_{\lambda r}(t) + K_I \int_{t_0}^{t} e_{\lambda r}(t) + K_D \frac{de_{\lambda r}(t)}{dt};$$

wherein $T_f(t)$ is the front-axis target torque, $T_{f0}$ is the front-axis initial torque, $e_{\lambda f}(t)$ is the difference between the front-axis target slip ratio and the front-axis actual slip ratio, $T_r(t)$ is the rear-axis target torque, $T_{r0}$ is the rear-axis initial torque, $e_{\lambda r}(t)$ is the difference between the rear-axis target slip ratio and the rear-axis actual slip ratio, $K_P$ is a proportional module gain coefficient, $K_I$ is an integral module gain coefficient, $K_D$ is a differential module gain coefficient, $t_0$ is the time point at which the vehicle is in the unstable state, and t the current time point.

11. A vehicle stability control device comprising:
a processor; and
a memory coupled to the processor and having processor-executable instructions stored thereon, which upon execution by the processor cause the vehicle stability control device to implement operations including:
  upon the vehicle being in an unstable state, obtain a required yawing moment, a front-axis actual slip ratio, a rear-axis actual slip ratio, a front-axis initial torque, and a rear-axis initial torque of the vehicle at a current time point;
  determine a correspondence between a yawing moment of the vehicle and a front-axis slip ratio and a rear-axis slip ratio of the vehicle, and determine a front-axis target slip ratio and a rear-axis target slip ratio based on the required yawing moment and the determined correspondence between the yawing moment and the front-axis slip ratio and the rear-axis slip ratio;
  determine a front-axis target torque based on the front-axis initial torque and a difference between the front-axis target slip ratio and the front-axis actual slip ratio, and determine a rear-axis target torque based on the rear-axis initial torque and a difference between the rear-axis target slip ratio and the rear-axis actual slip ratio; and
  control stability of the vehicle based on the front-axis target torque and the rear-axis target torque.

12. The device according to claim 11, wherein the instructions further cause the device to:
  obtain a longitudinal driving speed, a wheel steering angle, and an actual yawing angular velocity of the vehicle at the current time point;
  determine a target yawing angular velocity based on the longitudinal driving speed, the wheel steering angle, and a stored steering characteristic factor, wherein the steering characteristic factor is used to represent a constant value of a steering characteristic of the vehicle;
  determine an angular velocity error between the actual yawing angular velocity and the target yawing angular velocity; and
  in response to the angular velocity error does not fall within a preset threshold interval, determine that the vehicle is in an unstable state, wherein the preset threshold interval is an interval formed by the first threshold and the second threshold, the first threshold is a positive number, and the second threshold is a negative number.

13. The device according to claim 12, wherein the target yawing angular velocity meets the following:

$$\gamma_d(t) = \frac{v_x(t)\delta(t)}{(l_f + l_r)(1 + K v_x(t)^2)}$$

wherein $\gamma_d(t)$ is the target yawing angular velocity, $v_x(t)$ is the longitudinal driving speed, $\delta(t)$ is the wheel steering angle, $l_f$ is a distance from a center of mass of the vehicle to a front axis, $l_r$ is a distance from the center of mass of the vehicle to a rear axis, K is the steering characteristic factor, and t is the current time point.

14. The device according to claim 12, wherein upon obtaining the required yawing moment, the instructions further cause the device to:
  determine the required yawing moment based on the angular velocity error.

15. The device according to claim 14, wherein
in response to the angular velocity error being greater than the first threshold, the required yawing moment meets the following:

$$M(t) = -\text{sign}(\delta(t)) * \left( K_{Po} e_\gamma(t) + K_{Io} \int_{t_0}^{t} e_\gamma(t) + K_{Do} \frac{de_\gamma(t)}{dt} \right)$$

in response to the angular velocity error being less than the second threshold, the required yawing moment meets the following:

$$M(t) = \text{sign}(\delta(t)) * \left( K_{Pu} e_\gamma(t) + K_{Iu} \int_{t_0}^{t} e_\gamma(t) + K_{Du} \frac{de_\gamma(t)}{dt} \right)$$

wherein M(t) is the required yawing moment, sign($\delta$(t)) is a sign function, $\delta$(t) is the wheel steering angle, $e_\gamma$(t) is a difference between the actual yawing angular velocity and the target yawing angular velocity, $K_{Po}$ is a proportional module gain coefficient of the vehicle in case of oversteering, $K_{Io}$ is an integral module gain coefficient of the vehicle in case of oversteering, $K_{Do}$ is a differential module gain coefficient of the vehicle in case of oversteering, $t_0$ is a time point at which the vehicle is in an unstable state, t is the current time point, $K_{Pu}$ is a proportional module gain coefficient of the vehicle in case of understeering, $K_{Iu}$ is an integral module gain coefficient of the vehicle in case of understeering, and $K_{Du}$ is a differential module gain coefficient of the vehicle in case of understeering.

16. The device according to claim 12, wherein the angular velocity error meets the following:

$$e_\gamma(t) = \begin{cases} |\gamma(t)| - |\gamma_d(t)| & \gamma(t)\gamma_d(t) > 0 \\ |\gamma(t) - \gamma_d(t)| & \gamma(t)\gamma_d(t) < 0 \end{cases}$$

wherein $e_\gamma$(t) is the angular velocity error, $\gamma$(t) is the actual yawing angular velocity, and $\gamma_d$(t) is the target yawing angular velocity.

17. The device according to claim 11, wherein upon determining the correspondence between the yawing moment of the vehicle and the front-axis slip ratio and the rear-axis slip ratio of the vehicle, the instructions further cause the device to:
  obtain the wheel steering angle, a front-axis side slip angle, a rear-axis side slip angle, a front-axis vertical force, and a rear-axis vertical force of the vehicle at the current time point; and
  establish the correspondence between the yawing moment and the front-axis slip ratio and the rear-axis slip ratio based on the wheel steering angle, the front-axis side slip angle, the rear-axis side slip angle, the front-axis vertical force, and the rear-axis vertical force.

18. The device according to claim 17, wherein the correspondence between the yawing moment and the front-axis slip ratio and the rear-axis slip ratio meets the following:

$$M = \cos\delta(C_{1f}|\lambda_{fd}| + C_{0f})\alpha_f F_{zf} l_f - (C_{1r}|\lambda_{rd}| + C_{0r})\alpha_r F_{zr} l_r$$

wherein M is the yawing moment, $\delta$ is the wheel steering angle, $C_{1f}$ and $C_{0f}$ are linearization coefficients of a front-axis equivalent wheel model, $C_{1r}$ and $C_{0r}$ are linearization coefficients of a rear-axis equivalent wheel, $\lambda_{fd}$ is the front-axis slip ratio, $\lambda_{rd}$ is the rear-axis slip ratio, $\alpha_f$ is the front-axis side slip angle, $\alpha_r$ is the rear-axis side slip angle, $F_{zf}$ is the front-axis vertical force, $F_{zr}$ is the rear-axis vertical force, $l_f$ is the distance from the center of mass of the vehicle to the front axis, and $l_r$ is the distance from the center of mass of the vehicle to the rear axis.

19. The device according to claim 18, wherein upon determining the front-axis target slip ratio and the rear-axis target slip ratio based on the required yawing moment and the determined correspondence between the yawing moment and the front-axis slip ratio and the rear-axis slip ratio, the instructions further cause the device to:
  determine a plurality of slip ratio combinations based on the required yawing moment and the correspondence between the yawing moment and the front-axis slip ratio and the rear-axis slip ratio, wherein each slip ratio combination includes one front-axis slip ratio and one rear-axis slip ratio;
  select, from the plurality of slip ratio combinations, at least one slip ratio combination in which the front-axis slip ratio and the rear-axis slip ratio are less than 0;
  select, from the at least one slip ratio combination, a target slip ratio combination in which a sum of an absolute value of the front-axis slip ratio and an absolute value of the rear-axis slip ratio is smallest; and
  determine the front-axis slip ratio in the target slip ratio combination as the front-axis target slip ratio, and determining the rear-axis slip ratio in the target slip ratio combination as the rear-axis target slip ratio.

20. The device according to claim 11, wherein
the front-axis target torque meets the following:

$$T_f(t) = T_{f0} + K_P e_{\lambda f}(t) + K_I \int_{t_0}^{t} e_{\lambda f}(t) + K_D \frac{de_{\lambda f}(t)}{dt};$$

the rear-axis target torque meets the following:

$$T_r(t) = T_{r0} + K_P e_{\lambda r}(t) + K_I \int_{t_0}^{t} e_{\lambda r}(t) + K_D \frac{de_{\lambda r}(t)}{dt};$$

wherein $T_f$(t) is the front-axis target torque, $T_{f0}$ is the front-axis initial torque, $e_{\lambda f}$(t) is the difference between the front-axis target slip ratio and the front-axis actual slip ratio, $T_r$(t) is the rear-axis target torque, $T_{r0}$ is the rear-axis initial torque, $e_{\lambda r}$(t) is the difference between the rear-axis target slip ratio and the rear-axis actual slip ratio, $K_P$ is a proportional module gain coefficient, $K_I$ is an integral module gain coefficient, $K_D$ is a differential module gain coefficient, $t_0$ is the time point at which the vehicle is in the unstable state, and t the current time point.

* * * * *

UNITED STATES PATENT AND TRADEMARK OFFICE
CERTIFICATE OF CORRECTION

PATENT NO. : 11,731,611 B2
APPLICATION NO. : 17/326006
DATED : August 22, 2023
INVENTOR(S) : Liu et al.

It is certified that error appears in the above-identified patent and that said Letters Patent is hereby corrected as shown below:

In the Claims

Claim 5: Column 32, Lines 21-24:

"$M(t) = -sign(\delta(t)) * (K_{Po}e_\gamma(t) + K_o \int_{t_0}^{t} e_\gamma(t) + K_{Do}\frac{de_\gamma(t)}{dt})$,"

Should read:

--$M(t) = -sign(\delta(t)) * (K_{Po}e_\gamma(t) + K_{Io} \int_{t_0}^{t} e_\gamma(t) + K_{Do}\frac{de_\gamma(t)}{dt})$--.

Claim 5: Column 32, Lines 31-34:

"$M(t) = sign(\delta(t)) * (K_{Pu}e_\gamma(t) + K_u \int_{t_0}^{t} e_\gamma(t) + K_{Du}\frac{de_\gamma(t)}{dt})$,"

Should read:

--$M(t) = sign(\delta(t)) * (K_{Pu}e_\gamma(t) + K_{Iu} \int_{t_0}^{t} e_\gamma(t) + K_{Du}\frac{de_\gamma(t)}{dt})$--.

Claim 15: Column 35, Lines 21-24:

"$M(t) = sign(\delta(t)) * (K_{Pu}e_\gamma(t) + K_{iu} \int_{t_0}^{t} e_\gamma(t) + K_{Du}\frac{de_\gamma(t)}{dt})$,"

Should read:

--$M(t) = sign(\delta(t)) * (K_{Pu}e_\gamma(t) + K_{Iu} \int_{t_0}^{t} e_\gamma(t) + K_{Du}\frac{de_\gamma(t)}{dt})$--.

Signed and Sealed this
Ninth Day of January, 2024

Katherine Kelly Vidal
*Director of the United States Patent and Trademark Office*